United States Patent
Collin

(10) Patent No.: US 10,254,532 B2
(45) Date of Patent: Apr. 9, 2019

(54) HYBRID HOLOGRAPHIC SIGHT

(71) Applicant: Ziel Optics Inc., Ann Arbor, MI (US)

(72) Inventor: Fred Collin, Brighton, MI (US)

(73) Assignee: Ziel Optics, Inc., Ann Arbor, MI (US)

( * ) Notice: Subject to any disclaimer, the term of this patent is extended or adjusted under 35 U.S.C. 154(b) by 352 days.

(21) Appl. No.: 15/189,738

(22) Filed: Jun. 22, 2016

(65) Prior Publication Data

US 2016/0377378 A1    Dec. 29, 2016

Related U.S. Application Data

(60) Provisional application No. 62/279,164, filed on Jan. 15, 2016, provisional application No. 62/184,927, filed on Jun. 26, 2015.

(51) Int. Cl.
| | |
|---|---|
| *G02B 23/10* | (2006.01) |
| *F41G 1/30* | (2006.01) |
| *G02B 5/32* | (2006.01) |
| *G02B 27/34* | (2006.01) |

(52) U.S. Cl.
CPC ............ *G02B 23/10* (2013.01); *F41G 1/30* (2013.01); *G02B 5/32* (2013.01); *G02B 27/34* (2013.01)

(58) Field of Classification Search
None
See application file for complete search history.

(56) References Cited

U.S. PATENT DOCUMENTS

| | | | |
|---|---|---|---|
| 5,020,892 A | 6/1991 | Glover et al. | |
| 5,483,362 A | 1/1996 | Tai et al. | |
| 5,508,843 A | 4/1996 | Tomita | |
| 5,706,600 A | 1/1998 | Toole et al. | |
| 5,754,574 A | 5/1998 | Lofthouse-Zeis et al. | |
| 5,784,182 A | 7/1998 | Francoeur et al. | |
| 5,815,936 A | 10/1998 | Sieczka et al. | |
| 6,101,200 A | 8/2000 | Burbidge et al. | |
| 6,654,152 B2 | 11/2003 | Jacobowitz et al. | |
| 6,738,187 B2 | 5/2004 | DeCusatis et al. | |

(Continued)

FOREIGN PATENT DOCUMENTS

| | | |
|---|---|---|
| EP | 1154284 A1 | 11/2001 |
| GB | 578958 A | 7/1946 |

(Continued)

OTHER PUBLICATIONS

Chhajed, S. et al., "Junction temperature in light-emitting diodes assessed by different methods," Proc. SPIE 5739, Light-Emitting Diodes: Research, Manufacturing, and Applications IX, 16 (Mar. 25, 2005); doi:10.1117/12.593696.

(Continued)

*Primary Examiner* — Jennifer D. Carruth

(74) *Attorney, Agent, or Firm* — Dinsmore & Shohl LLP

(57) ABSTRACT

A hybrid holographic sight generates a reticle or other image for aiming a weapon or an optical device. The hybrid holographic sight includes a light source operable to project a light beam along a path and a holographic optical element (HOE) disposed in the path of the light beam. The HOE reconstructs an image of a reticle and a non-diffraction element reflects the image of the reticle, whereby a user may view a reflection of the reconstructed reticle in the non-diffraction element (NDE).

21 Claims, 21 Drawing Sheets

(56) References Cited

U.S. PATENT DOCUMENTS

| | | |
|---|---|---|
| 6,751,014 B2 | 6/2004 | DeCusatis et al. |
| 6,947,458 B2 | 9/2005 | Moriarty et al. |
| 7,190,904 B2 | 3/2007 | DeCusatis et al. |
| 7,356,057 B2 | 4/2008 | Deng et al. |
| 7,542,189 B2 | 6/2009 | Tanimura et al. |
| 8,208,507 B2 | 6/2012 | Lerner et al. |
| 8,233,209 B2 | 7/2012 | Miyatake et al. |
| 8,235,605 B2 | 8/2012 | Kim |
| 8,345,719 B2 | 1/2013 | Moench et al. |
| 8,559,821 B2 | 10/2013 | Wen et al. |
| 8,578,646 B2 | 11/2013 | Joannes |
| 8,605,763 B2 | 12/2013 | Castillo et al. |
| 8,607,495 B2 | 12/2013 | Moore et al. |
| 8,638,387 B2 | 1/2014 | Aizpuru et al. |
| 8,739,454 B2 | 6/2014 | Erdle et al. |
| 8,756,852 B2 | 6/2014 | Kramer et al. |
| 8,833,655 B2 | 9/2014 | McCarty et al. |
| 8,837,877 B2 | 9/2014 | Kimerling et al. |
| 8,850,950 B2 | 10/2014 | Deckard et al. |
| 8,879,146 B2 | 11/2014 | LoRocco et al. |
| 8,887,430 B2 | 11/2014 | Wichner |
| 8,888,491 B2 | 11/2014 | Carter |
| 2005/0073690 A1 | 4/2005 | Abbink et al. |
| 2005/0082553 A1 | 4/2005 | Yamamoto et al. |
| 2005/0188583 A1 | 9/2005 | Jackson et al. |
| 2005/0225853 A1 | 10/2005 | Hakansson et al. |
| 2006/0022213 A1 | 2/2006 | Posamentier |
| 2006/0182441 A1 | 8/2006 | Kish et al. |
| 2008/0010841 A1 | 1/2008 | Gordon |
| 2008/0031294 A1 | 2/2008 | Krishnamoorthy et al. |
| 2011/0031903 A1 | 2/2011 | Nguyen Hoang et al. |
| 2011/0129227 A1 | 6/2011 | Wen et al. |
| 2011/0164633 A1 | 7/2011 | Moench et al. |
| 2011/0228803 A1 | 9/2011 | Guenter et al. |
| 2013/0033746 A1 | 2/2013 | Brumfield |
| 2014/0026464 A1 | 1/2014 | Wiklund |
| 2014/0056322 A1 | 2/2014 | Castillo et al. |
| 2014/0109457 A1 | 4/2014 | Speroni |
| 2014/0130395 A1 | 5/2014 | Scroggins |
| 2014/0160475 A1 | 6/2014 | Kingsbury et al. |
| 2014/0169390 A1 | 6/2014 | Spiekermann |
| 2014/0238429 A1 | 8/2014 | Mizuno et al. |
| 2014/0268323 A1 | 9/2014 | Feinberg |
| 2014/0283431 A1 | 9/2014 | Tuller, Jr. et al. |
| 2014/0290113 A1 | 10/2014 | Thomas et al. |
| 2014/0290114 A1 | 10/2014 | Thomas et al. |
| 2014/0295380 A1 | 10/2014 | Amis et al. |
| 2014/0305022 A1 | 10/2014 | Chung |
| 2014/0305023 A1 | 10/2014 | Moore et al. |
| 2014/0305025 A1 | 10/2014 | Tubb |
| 2014/0315156 A1 | 10/2014 | Averill |
| 2014/0319217 A1 | 10/2014 | Elefante |
| 2014/0334058 A1 | 11/2014 | Galvan et al. |
| 2016/0161735 A1* | 6/2016 | Armbruster ............ G02B 23/14 359/15 |

FOREIGN PATENT DOCUMENTS

| | | |
|---|---|---|
| GB | 2149141 A | 6/1985 |
| WO | 9201203 A1 | 1/1992 |
| WO | WO-200050836 A1 | 8/2000 |
| WO | WO-2007011803 A2 | 1/2007 |
| WO | WO-2009044387 A2 | 4/2009 |
| WO | 2009136858 A1 | 11/2009 |
| WO | WO-2014056105 A2 | 4/2014 |
| WO | 2015009720 A2 | 1/2015 |

OTHER PUBLICATIONS

Fukada, M. et al., "Temperature and current coefficients of lasing wavelength in tunable diode laser spectroscopy," App. Phys B., Aug. 2010; 100(2): 377-382.

Chonko, J. et al., "Using Forward Voltage to Measure Semiconductor Junction Temperature," Keithley Instruments, Inc., Cleveland, Ohio, Feb. 2006, pp. 1-3.

* cited by examiner

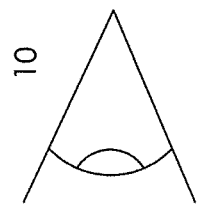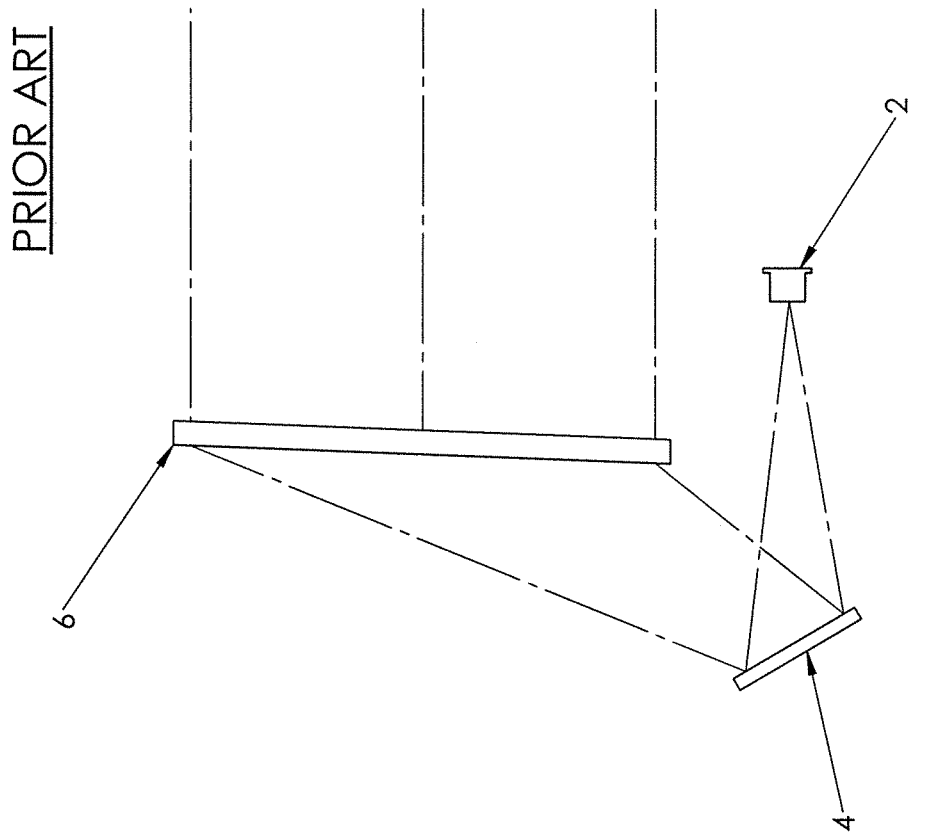
FIG. 1

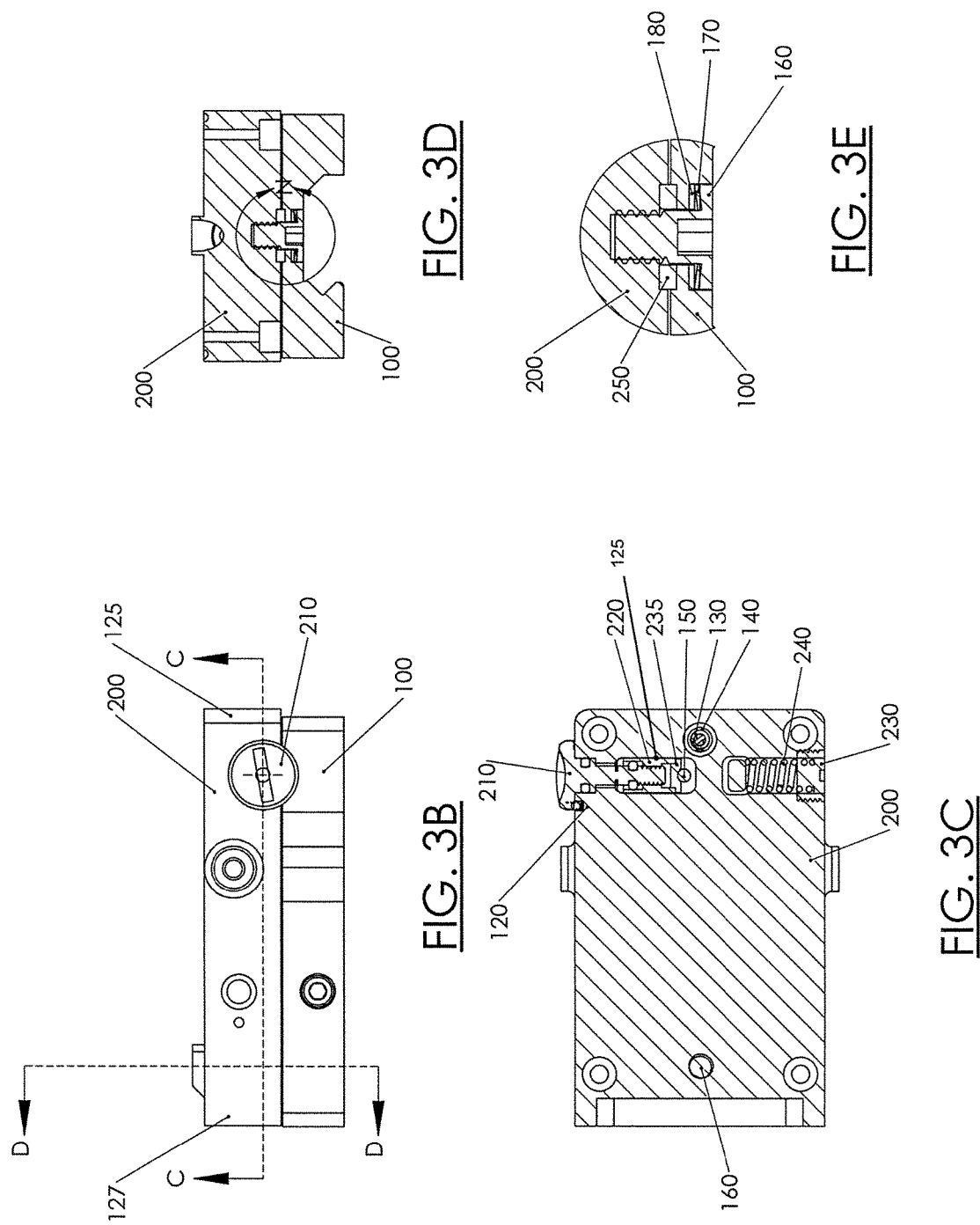

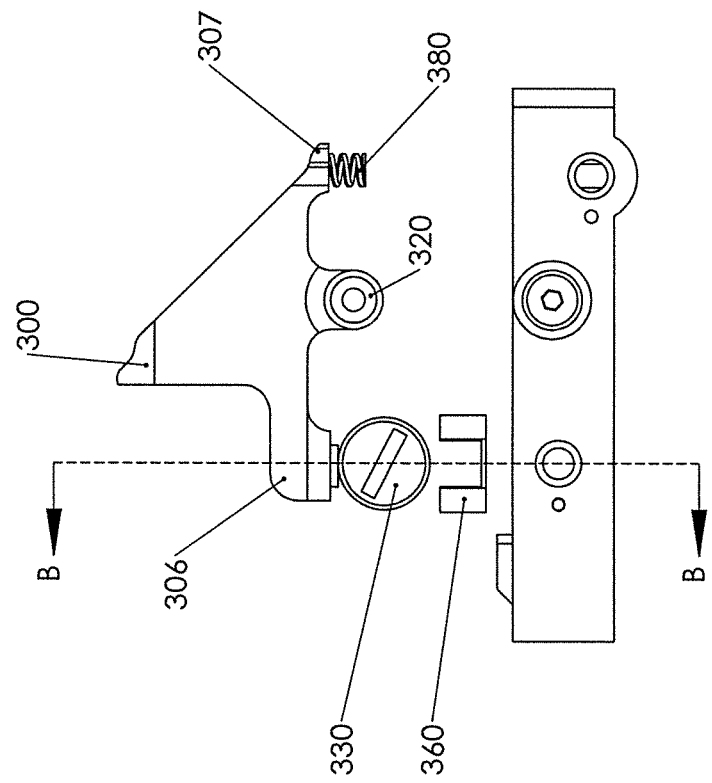
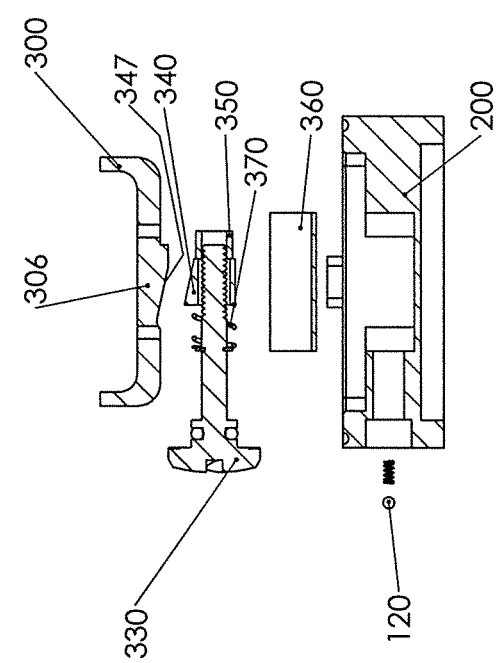
FIG. 5A
FIG. 5B

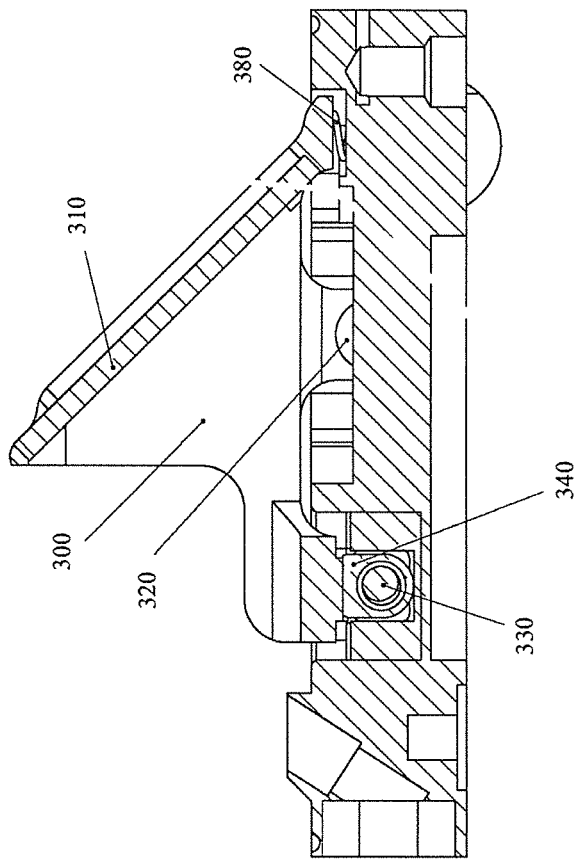
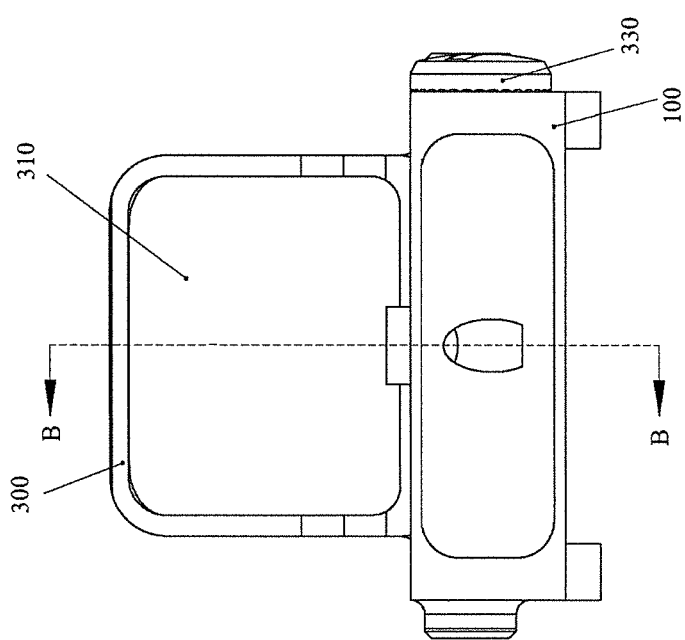
FIG. 8B
FIG. 8A

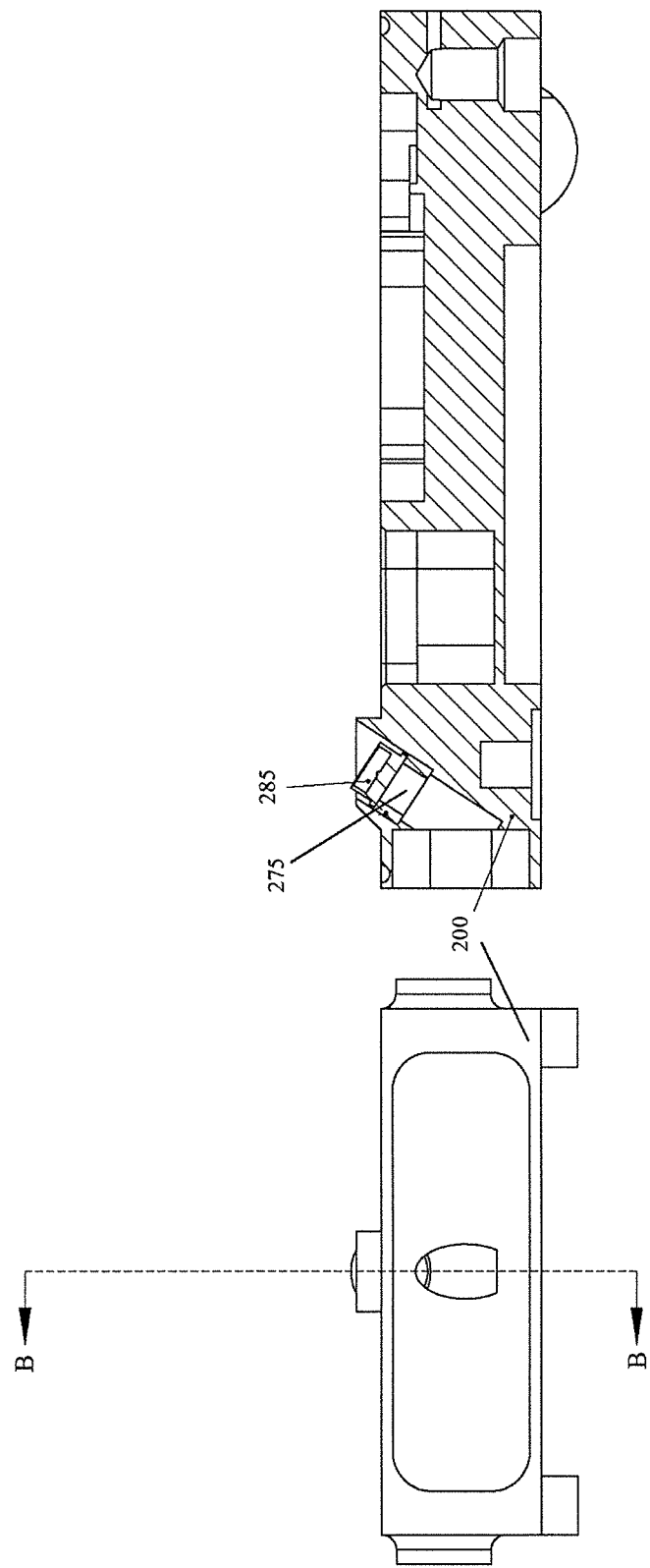

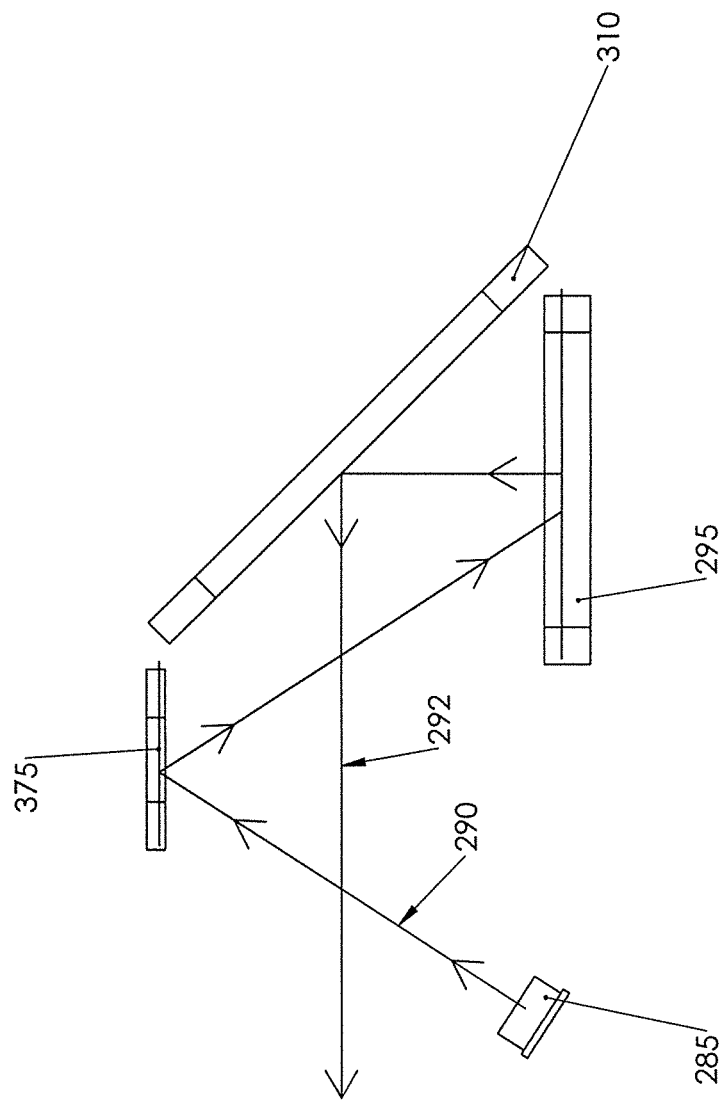
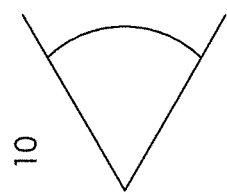
FIG. 13

HYBRID HOLOGRAPHIC SIGHT

CROSS REFERENCE TO RELATED APPLICATION

This application claims priority to U.S. provisional application Ser. No. 62/184,927 filed Jun. 26, 2015 entitled "Hybrid Holographic Sight", and U.S. provisional application Ser. No. 62/279,164, filed Jan. 15, 2016 entitled "Hybrid Holographic Sight", both of which are incorporated herein in their entirety by reference.

FIELD OF THE INVENTION

The present invention relates generally to sighting devices that generate a reticle or other image for aiming weapons or optical devices.

BACKGROUND OF THE INVENTION

There are several types of sights available in the market to enable a user of a weapon such as a rifle, shotgun, handgun, or submachine gun to aim these weapons. Examples of such sighting devises include laser sights, holographic sights, and "reflex" or "red dot" sights. FIG. 1 schematically illustrates an example of a prior art device. Here a light beam from a light source 2 illuminates a mirror 4. The light source 2 may be a laser diode. The mirror 4 then reflects the light beam onto a holographic optical element (HOE) 6 and the HOE 6 reconstructs an image of a reticle. A user's eye 10 can view the image of the reticle and a target (not shown) through the HOE 6. The light beam that illuminates the HOE 6 is not only projected toward the eye 10 but it also escapes in the opposite direction away from the eye 10. A portion of light also passes through the HOE 6 and may illuminate the housing of the sight. This light might be visible to someone at a distance. Furthermore, a user views the target through the HOE 6 and the HOE 6 may reduce the amount of light received by the eye 10 from a target area. It would be desirable to overcome the limitations of existing sights and to provide a better solution.

SUMMARY OF THE INVENTION

An embodiment of a hybrid holographic gun sight may comprise a housing having a viewing end and an opposing target end, wherein a viewing path may be defined from the viewing end to the target end. The sight may have a light source that is operable to project a light beam along a path; a holographic optical element (HOE) disposed in the path of the light beam, the HOE may reconstruct an image of a reticle; and a non-diffraction element (NDE) reflecting the image of the reticle. The non-diffraction element may be disposed in the viewing path such that a user views a target along the viewing path through the non-diffraction element from the viewing end.

Some embodiments may have a laser diode or a vertical-cavity surface-emitting laser diode (VCSEL) as the light source. The non-diffraction element (NDE) may be selected from the group consisting of a partial mirror, a glass element and an optical element with a dichroic film coating. Some embodiments may further comprise a grating that is disposed in the path of the light beam from the light source. The grating may reconstruct a beam and illuminate the HOE with the reconstructed beam. The light path may be defined as extending along the path of the light beam and the path of the reconstructed beam. Other embodiments may further comprise a mirror that is disposed in the path of the light beam from the light source. The mirror may reflect the light beam onto the holographic optical element (HOE) and illuminate the holographic optical element (HOE).

The sight may also comprise an adjustment mechanism that may be selected from the group consisting of a temperature compensator and a mirror adjustment mechanism. The temperature compensator may support the light source and be operable to change an angle and/or position of the light beam projected by the light source along the path. The temperature compensator may have a coefficient of thermal expansion and may change the angle and/or position of the light beam in response to changes in temperature. A mirror adjustment mechanism may be operable to move the mirror relative to at least one axis and may comprise a mirror temperature compensator having a coefficient of thermal expansion such that the mirror temperature compensator moves the mirror in response to changes in temperature.

In certain embodiments of the sight, the light beam that illuminates the holographic optical element may be a non-collimated light beam. The light source of the sight may directly illuminate the HOE without any intermediate element. Some embodiments of the sight may further comprise a polarizer disposed between the light source and the HOE.

The sight may further comprise a base that is configured to attach to a weapon. The base may have a lower surface and an upper surface, and the lower surface may be configured to engage the weapon or the optical device. The sight may also have a front window disposed at the target end of the housing and a rear window at the viewing end of the housing. Each window may comprise a protective lens spaced apart from the non-diffraction element (NDE) whereby the non-diffraction element (NDE) remains functional even if one of the protective lenses is removed or broken.

The sight may also have an adjustment mechanism that is operable to move the non-diffraction element relative to at least one axis, thereby providing a windage and/or elevation adjustment. The sight may further comprise a base configured to attach to a weapon or an optical device. The base may have a lower surface and an upper surface. The lower surface may be configured to engage the weapon or the optical device. Certain embodiments of the sight may have a carrier with a lower surface and an upper surface. The lower surface of the carrier may be disposed near the upper surface of the base. The carrier may have a front surface, a rear surface and two opposing side surfaces. The holographic optical element (HOE) and the light source may be disposed on the upper surface of the carrier.

Some embodiments of the sight may have a vertical pivot bolt connecting the carrier to the base such that the carrier is pivotally movable in a generally horizontal plane about a vertical axis defined by the pivot bolt. A windage adjustment mechanism may be disposed in the carrier. The windage adjustment mechanism may have a windage screw operable to pivotally move the carrier about the vertical axis. The sight may also have an element holder disposed above the upper surface of the carrier and pivotally connected to the two opposing side surfaces for pivoting about a horizontal transverse axis. The non-diffraction element (NDE) may be disposed in the element holder an angle with respect to the upper surface of the carrier.

According to some embodiments, the sight may have an elevation adjustment mechanism with an elevation screw disposed through one of the side surfaces of the carrier near the rear surface of the carrier. An elevation nut may be attached to the elevation screw. The elevation nut may have an upper surface and a lower surface. The upper surface may be angled with respect to the upper surface of the carrier and the upper surface of the elevation nut may be in contact with the element holder such that transverse movement of the elevation nut pivotably moves the element holder. The elevation adjustment mechanism may further have a resilient member disposed between the element holder and the upper surface of the carrier near the front surface of the carrier to bias a front portion of the element holder away from the carrier. The housing may comprise a window housing with a top wall, an open bottom, two opposing lateral walls, a front window and a rear window cooperating to define an interior chamber of the housing. The front and rear windows may longitudinally oppose each other and the housing may be disposed on the carrier such that the element holder is disposed in the interior chamber.

A mirror may be disposed on an inner surface of the top wall in the path of the light beam from the light source. The mirror may reflect the light beam onto the holographic optical element (HOE) and illuminate the holographic optical element (HOE). According to other embodiments, the adjustable holographic sight may comprise a housing having a viewing end and an opposing front end. A viewing path may be defined from the viewing end to the front end. The sight may have a light source operable to project a light beam along a path. A holographic optical element (HOE) may be disposed in the path of the light beam and the HOE may reconstruct an image of a reticle. The sight may also have a non-diffraction element (NDE) reflecting the image of the reticle. The non-diffraction element may be disposed in the viewing path such that a user views a target along the viewing path through the non-diffraction element from the viewing end. The sight may have an adjustment mechanism operable to move the non-diffraction element relative to at least one axis, thereby providing a windage and/or elevation adjustment.

The sight may be a weapon sight or a sight for an optical instrument. The sight may further comprise a base having a lower surface and an upper surface, the lower surface of the base may be configured to engage the weapon or the optical device. The sight may also have a carrier with a lower surface and an upper surface. The lower surface of the carrier may be disposed near the upper surface of the base. The holographic optical element (HOE) and the light source may be disposed on the upper surface of the carrier. The sight may also have a vertical pivot bolt connecting the carrier to the base such that the carrier is pivotally movable in a generally horizontal plane about a vertical axis defined by the pivot bolt. The adjustment mechanism may comprise a windage adjustment mechanism disposed in the carrier. The windage adjustment mechanism may have a windage screw operable to pivotally move the carrier about the vertical axis.

Certain embodiments may further comprise an element holder supporting the non-diffraction element (NDE) disposed at an angle with respect to the viewing path. The element holder may be pivotal with respect a transverse axis. The adjustment mechanism may comprise an elevation adjustment mechanism operable to pivot the element holder with respect to the transverse axis. The elevation adjustment mechanism may comprise an elevation screw and an elevation nut attached to the elevation screw. The elevation nut may have an upper surface and a lower surface. The upper surface may have an angle, the upper surface of the elevation nut being in contact with the element holder such that transverse movement of the elevation nut pivotally moves the element holder. The elevation adjustment mechanism may also have a resilient member biasing the element holder into contact with the elevation nut.

In certain embodiments of the sight, the housing may comprise a window housing with a top wall, two opposing lateral walls, a front window and a rear window cooperating to define an interior chamber of the housing. The front and rear windows may longitudinally oppose each other and the non-diffraction element (NDE) may be disposed in the interior chamber. This embodiment may further comprise a mirror disposed on an inner surface of the top wall in the path of the light beam from the light source. The mirror may reflect the light beam so as to illuminate the HOE. The light source may be a laser diode or a vertical-cavity surface-emitting laser diode (VCSEL). Moreover, the non-diffraction element (NDE) may be selected from the group consisting of a partial mirror, a glass element and an optical element with a dichroic film coating.

It is noted that in certain embodiments, there is no holographic optical element (HOE) in the viewing path. It is also noted that in certain embodiments, the sight includes only a single holographic optical element (HOE). Other embodiments may include an additional holographic optical element (HOE), such as a grating to generate the beam that illuminates the reticle-reconstructing HOE.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

BRIEF DESCRIPTION OF THE DRAWINGS

The accompanying drawings, which are included to provide a further understanding of the invention and are incorporated in and constitute a part of this application, illustrate embodiment (s) of the invention and together with the description serve to explain the principle of the invention. In the drawings:

FIG. 1 is a light path diagram of an example of a prior art sighting device;

FIG. 3B is a side view of a portion of the sight of FIG. 3A showing the windage adjustment mechanism;

FIG. 3C is a cross sectional view of the windage adjustment mechanism of FIG. 3B taken along lines C-C;

FIG. 3D is a cross sectional view of the windage adjustment mechanism of FIG. 3B taken along lines D-D;

FIG. 3E is a detail view of part of the windage adjustment mechanism, as indicated at N in FIG. 3D;

FIG. 5A is an exploded side view of the elevation adjustment mechanism of FIG. 4;

FIG. 5B is a cross sectional view of the elevation adjustment mechanism of FIG. 5A taken along lines B-B;

FIG. 8A is a front view of a portion of the sight of FIG. 2 showing a non-diffraction element (NDE) holder;

FIG. 8B is a cross sectional view of the portion of FIG. 8A taken along lines B-B showing the non-diffraction element (NDE) holder;

FIG. 12A is a rear view of the carrier of the sight of FIG. 2;

FIG. 12B is a cross sectional view of the carrier of FIG. 12A taken along lines B-B;

FIG. 13 is a light path diagram for an embodiment of the present invention;

DETAILED DESCRIPTION OF THE INVENTION

Figure 2:
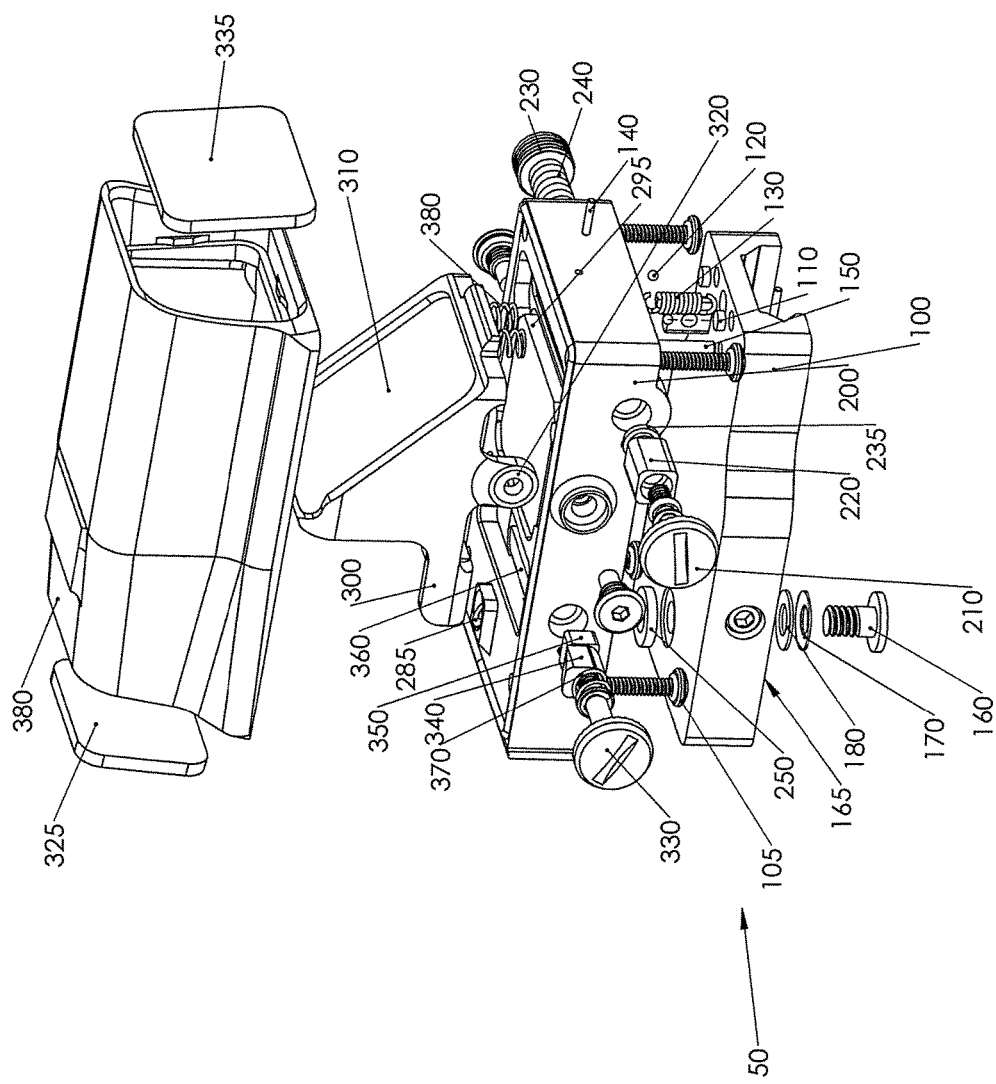
FIG. 2 is an exploded view of one version of a hybrid holographic sight.

The present invention relates generally to sighting devices that generate a reticle or other image for aiming weapons or optical devices. Research has shown that a user of a weapon or optical device having a reticle is more likely and easily able to locate a target in comparison to a user using a "red dot" sight. A reconstructed reticle is defined as a virtual image created by a holographic element and, as used herein, is defined to include any image reconstructed by the holographic optical element, whether or not that image is a traditional reticle shape. The present invention provides a sight referred to as a hybrid holographic sight. It comprises a light source to project a light beam, which may be a non-collimated light beam, along a path. A holographic optical element (HOE) is disposed in the path of the light beam, which reconstructs an image of a reticle. As used herein, a holographic optical element (HOE) is defined as an optical element (such as a lens, filter, beam splitter, or diffraction grating) that is produced using holographic imaging processes or principles. Any embodiment of this invention may have a non-diffraction element (NDE), which may consist of a partial mirror, glass or an element with a dichroic film coating. As used herein, an NDE is defined as an optical element for redirecting a pattern of a light beam while preserving wavefront and fringe characteristics. As such, an NDE is not an HOE. When the HOE reconstructs the image of a reticle, this image may be reflected in or by the NDE. Thus, the NDE may serve two functions for the sight. The NDE reflects the image such that it may be viewed by a user's eye. Additionally, a user may view a target through the same NDE such that the reticle is superimposed on the target. This facilitates a user for aiming the weapon or optical device. Therefore, a user views the reticle and the target through the NDE.

The sight may also have one or more mirrors and/or gratings placed in the path of the light beam. Shallow angles between the various components of certain versions help allow for a compact sight. Certain versions of the present invention are considered compact and intended for use with a hand held weapon, with "compact" being defined as occupying little space compared with others of its type. Accordingly, some versions of a sight of the present invention are significantly smaller and occupy less space as compared to similar gun sights. Furthermore, "hand held" may be defined as being for use with a rifle, handgun, pistol, etc. or any other known weapon used in a hand held manner. "Hand held" may also include weapons mounted to a tripod (or other mount) but small in nature (small compared to a vehicle or airplane). Hand held may include all other non-vehicle (i.e. a tank) weapons.

Certain versions of the sight may also have adjustments for compensating for windage, elevation, temperature and/or other factors. A hybrid holographic sight according to the present invention may take a variety of forms. Some examples of the present invention are shown in the Figures. However, the present invention is not limited to the illustrated embodiments. Terms of relative location, such as "upper", "lower", "front" and "back", are used herein for ease of description, but are not limiting on the actual orientation of the described or claimed embodiments. Reference will now be made in detail to some embodiments of the present invention, examples of which are illustrated in the accompanying drawings. Wherever possible, the same reference numbers will be used throughout the drawings to refer to the same or like parts.

FIG. 2 shows an exploded view of an embodiment of a hybrid holographic sight 50 that incorporates certain elements of the present invention. Not all such elements are required for all versions or embodiments. The sight 50 has a base 100 with an upper surface 105 and an opposing lower surface 165. The lower surface 165 of the base 100 is configured to attach to a weapon or an optical device (not shown). As shown, the lower surface may have a channel defined therein for attaching to a weapon or optical device. The sight may attach in other ways, including mounting to a separate clamping mechanism or support, with the mechanism or support connecting to the weapon or optical device.

The sight 50 also has a carrier 200 disposed on top of the upper surface 105 of the base 100. The carrier 200 and base 100 are best shown in FIGS. 3A-3E. The carrier 200 has an upper surface 115 and an opposing lower surface 175. The lower surface 175 of the carrier 200 is connected to the upper surface 105 of the base 100. The carrier 200 has a light source 285 and a holographic optical element (HOE) 295 disposed on the upper surface 115. The light source 285 may be a vertical-cavity surface-emitting laser diode (VCSEL) or other type of laser diode. Referring again to FIG. 2, a non-diffraction element (NDE) holder 300 is also attached to the carrier 200. The holder 300 supports a non-diffraction element (NDE) 310. The sight 50 also has a window housing 380 that houses the NDE holder 300 and is disposed on top of the carrier 200. The window housing 380 may have protective lenses (325, 335) disposed at the front and rear window. The protective lenses may be spaced apart from the non-diffraction element (NDE) 310 whereby the non-diffraction element (NDE) 310 remains functional even if one of the protective lenses (325, 335) is removed or broken. The window housing 380 may be optional for some versions of the present invention. Some embodiments may have a detachable mount (not shown) instead of the base 100 and carrier 200, and all other components of the present invention may be disposed on the detachable mount (not shown). In some versions, the base and carrier may together be referred to as a base or base assembly.

Figure 3A:
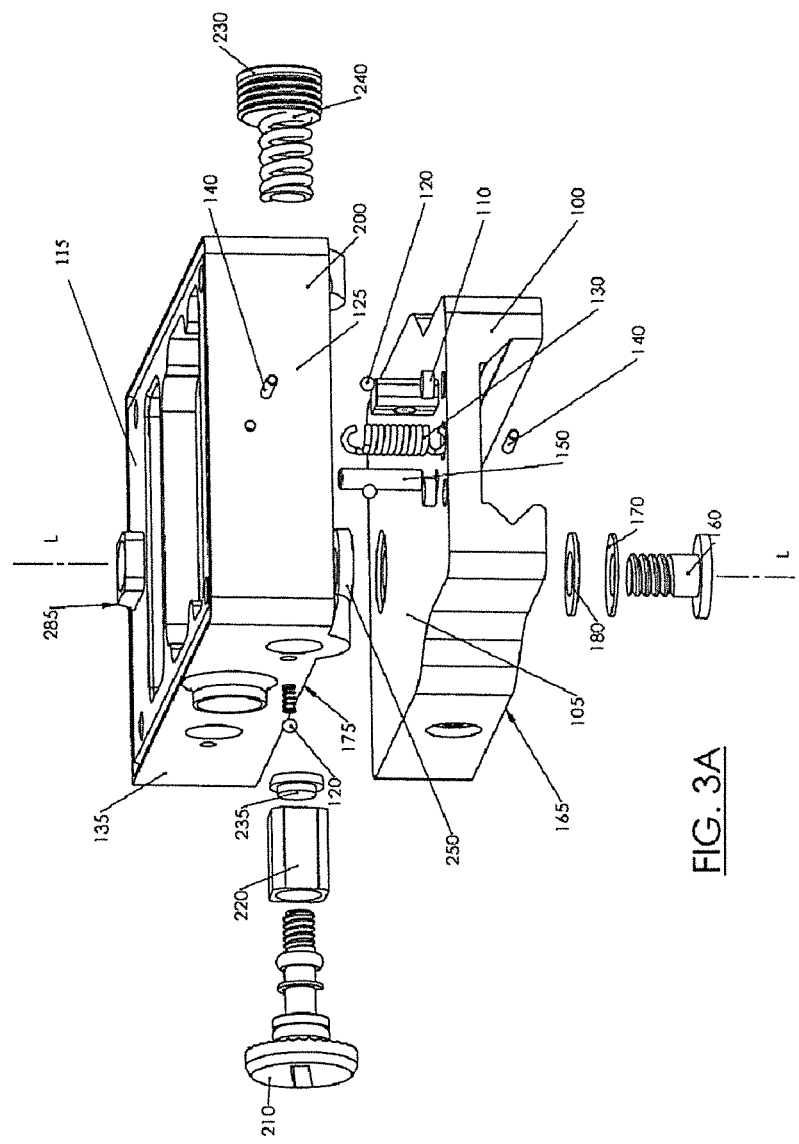
FIG. 3A is an exploded view of a portion of the sight of FIG. 2 showing a windage adjustment mechanism.

Wind affects a projectile/bullet by making it deviate to a side (horizontal deflection). Wind effect usually results in missing of a target and thus should be compensated for to improve accuracy. FIG. 3A shows an exploded view of a portion of the sight 50 of FIG. 2 showing a version of a windage adjustment mechanism for use with some embodiments of the present invention. FIGS. 3B-E show additional views of the windage adjustment mechanism. The lower surface 175 of the carrier 200 is disposed on the upper surface 105 of the base 100. The base 100 and the carrier 200 are connected by a vertical windage pivot bolt 160 such that the carrier 200 is pivotally movable in a generally horizontal plane about a vertical axis L-L shown in FIG. 3A. The pivot bolt 160 may also have a washer 170 and a bushing 180. Windage adjustment is accomplished by pivotally moving the carrier 200 relative to the base 100. The sight 50 has a spring 130 that is connected with the base 100 and the carrier 200 by the spring retention pins 140. The tension of the spring 130 biases the upper surface 105 of the base 100 towards or into contact with the lower surface 175 of the carrier 200. The sight also has ball bearing(s) 120 and hardened base pad(s) 110 to provide a sliding surface between the two surfaces.

The pivot axis is provided and defined by the windage pivot bolt 160, and is aided by the bushings 180 and 250 that are placed between the two sliding/rotating surfaces. The carrier 200 has a front surface 125, a back surface 127 and two opposing side surfaces 135. The sight 50 has a windage screw 210 that is connected with a windage nut 220. The windage screw 210 is located near the side surface 135 and is retained in the carrier 200. The windage screw 210 moves the windage nut 220 back and forth within a movement range defined by a slot (not shown) in the carrier 200. The windage nut 220 has a pad 235 attached to it, which interfaces with a windage pin 150. The windage pin 150 is attached to the base 100. The carrier 200 has a windage spring plug 230 and a windage compression spring 240 located at the side surface 135 opposite to the side surface 135 where the windage screw 210 is located. The pad 235 is in pressing contact against the windage pin 150 throughout the movement range due to the windage compression spring 240, which is compressed against the pin 150 and the spring plug 230. Therefore, when the windage screw 210 is rotated, the carrier 200 pivotally rotates about the pivot bolt 160 and this movement may be used for the windage compensation. The sensitivity of this compensation/adjustment may be controlled by the distance between the pivot bolt 160 and the pin 150, and/or the thread pitch of the windage screw 210.

Figure 4:
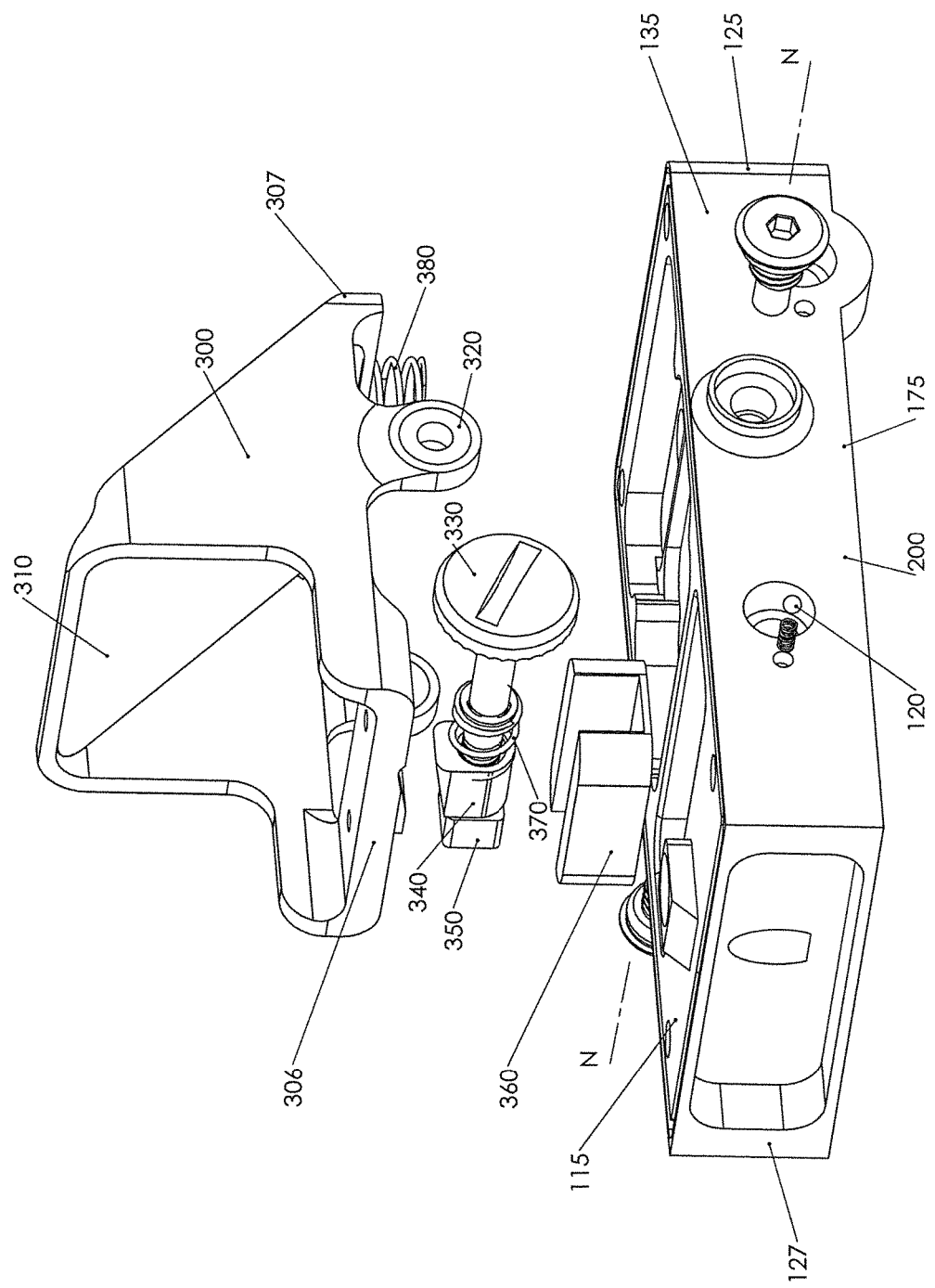
FIG. 4 is an exploded view of a portion of the sight of FIG. 2 showing an elevation adjustment mechanism.
Figure 6A:
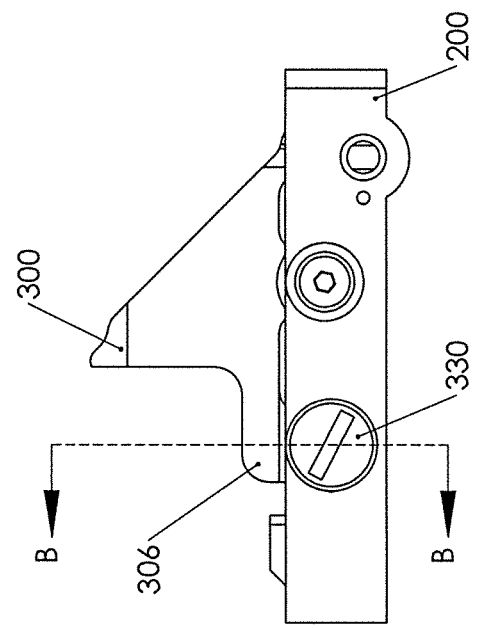
FIG. 6A is a side view of the elevation adjustment mechanism of FIG. 4.
Figure 6B:
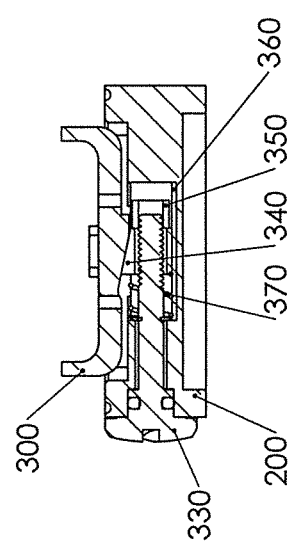
FIG. 6B is a cross sectional view of the elevation adjustment mechanism of FIG. 6A taken along lines B-B.

Although using a weapon for a nearby target is generally less troublesome, the effect of distance becomes evident with increasing range. The projectile/bullet begins to respond to the effects of gravity the instant it is free from the weapon. The imaginary line down the center axis of the bore and out to infinity is called the line of departure and is the line on which the projectile leaves the barrel. Due to the effects of gravity, a projectile will not impact a target higher than the line of departure. During firing, when a positively inclined projectile travels downrange, it arcs below the line of departure as it is being deflected off its initial path by gravity. This distance factor should be compensated to hit the distant target accurately. This may be compensated by using an elevation adjustment mechanism. FIG. 4 provides an exploded view of a portion of the sight of FIG. 2 showing an elevation adjustment mechanism that may be used with some embodiments of the present invention. FIG. 5A is an exploded side view of the elevation adjustment mechanism of FIG. 4. FIG. 5B is a cross sectional view of the elevation adjustment mechanism of FIG. 5A taken along line B-B. FIG. 6A is a side view of the elevation adjustment mechanism of FIG. 4. FIG. 6B is a cross sectional view of the elevation adjustment mechanism of FIG. 6A taken along line B-B.

As shown in FIG. 4, the sight 50 has an NDE holder 300 disposed above the upper surface 115 of the carrier 200, which is pivotally connected by elevation bushings 320 to the two opposing side surfaces 135 for pivoting about a horizontal transverse axis NN. The NDE holder 300 supports an NDE 310 at an angle with respect to the upper surface 115 of the carrier 200. In some versions, the NDE 310 is supported at an angle in the range of 40-50 degrees relative to a horizontal plane, the horizontal plane being parallel to a line along which a weapon with the sight is aimed. In further examples, the angle may be in the range of 30-60 degrees relative to the horizontal plane. In yet further examples, other angles may be used. The elevation adjustment mechanism is operable to adjust the position of the NDE relative to the horizontal plane, by pivoting about the axis NN, thereby adjusting the perceived vertical position of the reticle and adjusting for elevation. The elevation adjustment mechanism has an elevation screw 330 disposed through one of the side surfaces 135 of the carrier 200 near the rear surface 127 of the carrier 200. An elevation adjusting nut 340 is attached to the elevation screw 330, and the elevation screw 330 is held in position by a nut 350. As shown in FIG. 5B, the elevation adjusting nut 340 has an upper surface and a lower surface. The upper surface of the elevation adjusting nut 340 is angled with respect to the upper surface 115 of the carrier 200 and with respect to the horizontal plane. In some examples, the upper surface is angled in the range of 2-35 degrees with respect to the horizontal plane. A corresponding sloped surface 345 is provided on the underside of the rearward end 306 of the NDE holder 300. The elevation adjusting nut 340 is prevented from rotating by an elevation nut guide 360. The elevation nut guide defines a slot that receives the adjusting nut 340 and the flat sides of the slot engage the flat sides of the adjusting nut to prevent rotation. Other anti-rotation approaches may be used. The sloped surface 347 on the underside of the rearward end 306 of the NDE holder 300 is pressed into contact with the sloped upper surface of the elevation adjusting nut 340 by an elevation spring 380, which pushes upwardly on the underside of the forward end 307 of the holder 300. The elevation spring disposed between the NDE holder 300 and the upper surface 115 of the carrier 200 biases the NDE holder 300 away from the upper surface 115 of the carrier 200. The elevation adjustment mechanism may also have a spring 370 that keeps the elevation adjusting nut 340 pressed against the nut 350.

The NDE 310 reflects the image of a reticle that is reconstructed by the HOE 295. This reflected image is viewed by a user's eye. When the elevation screw 330 is rotated, the elevation adjusting nut 340 moves back and forth in the elevation nut guide 360 along a line parallel to the axis NN. This movement pivotally rotates the NDE holder 300 about the horizontal transverse axis NN, which changes the angle of the NDE 310 and the reflection is moved up or down relative to a user's eye. The elevation adjustment sensitivity may be controlled by the thread pitch of the elevation screw 330, the angle of upper surface of the elevation adjusting nut 340 and/or the rotation point of the NDE holder 300.

Figure 7B:
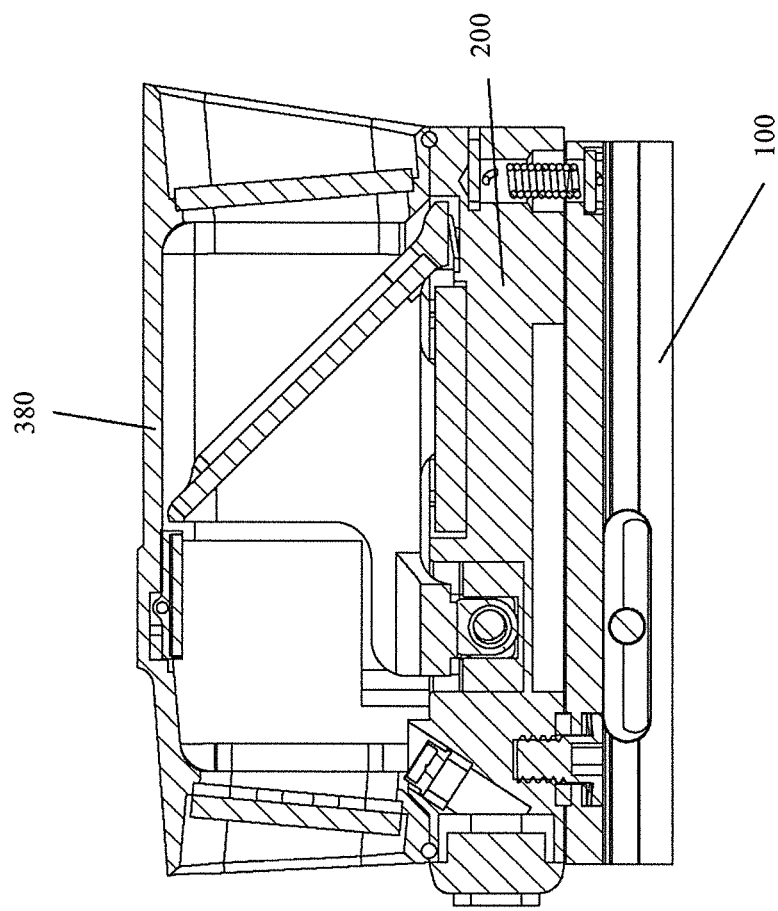
FIG. 7B is a cross sectional view of the sight of FIG. 7A taken along lines B-B.
Figure 7A:
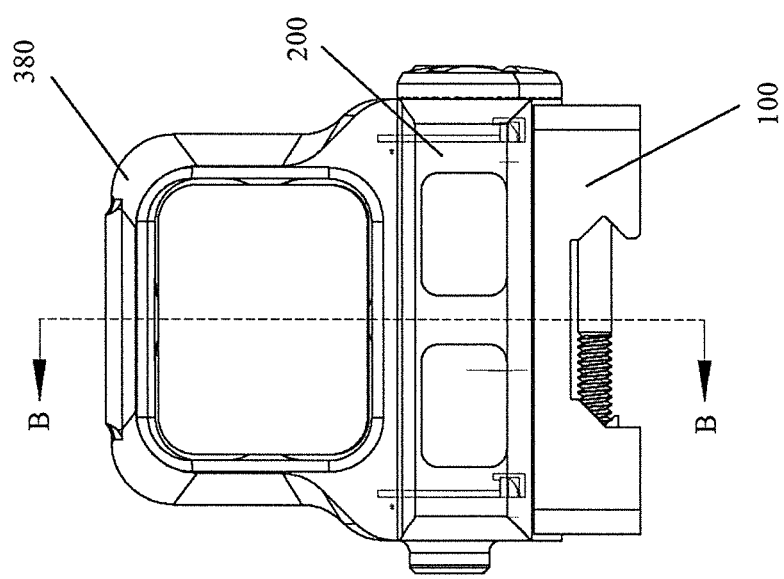
FIG. 7A is a rear view of the sight of FIG. 2.
Figure 9B:
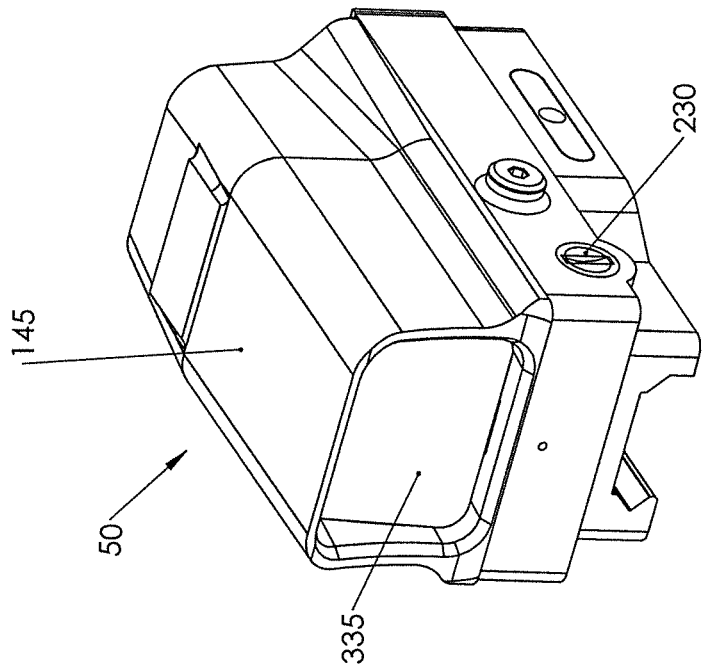
FIGS. 9A and 9B are rear and front perspective views, respectively, of the hybrid holographic sight of FIG. 2.
Figure 9A:
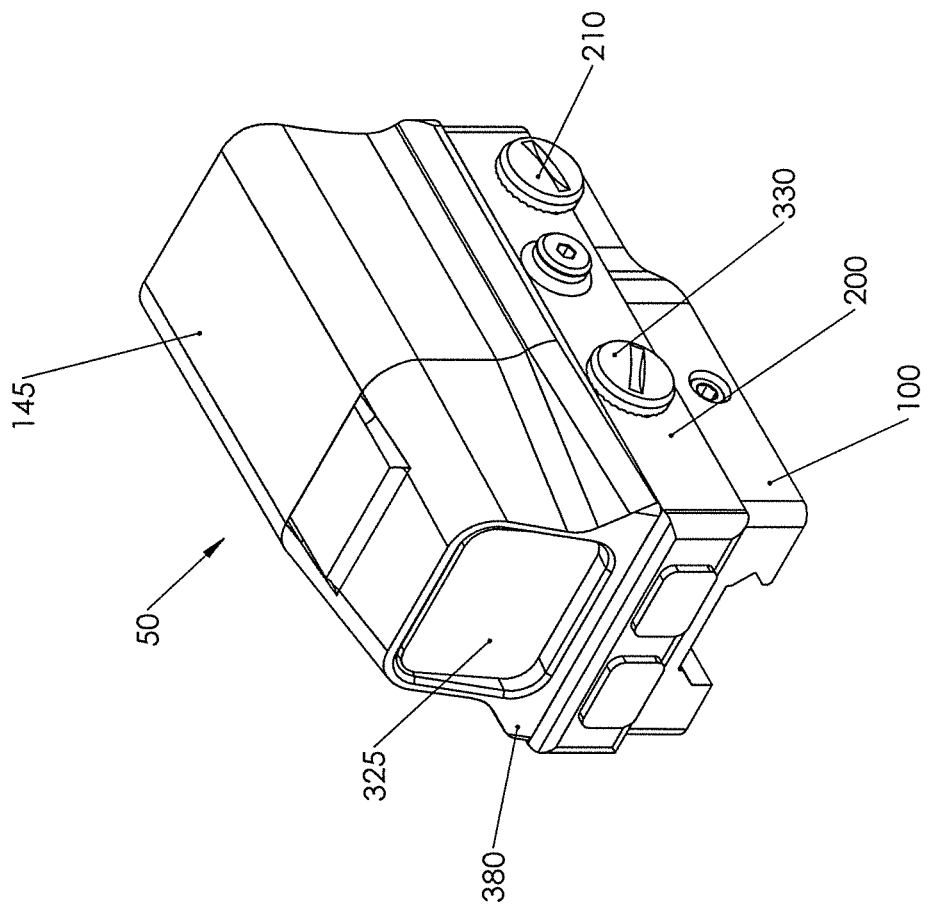
Figure 10B:
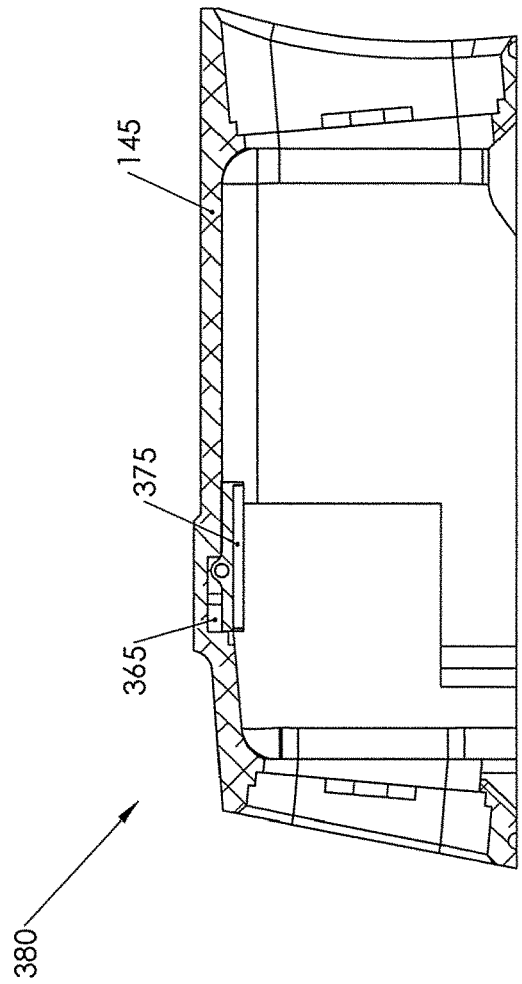
FIG. 10B is a cross sectional view of the window housing of FIG. 10A taken along lines B-B.
Figure 10A:
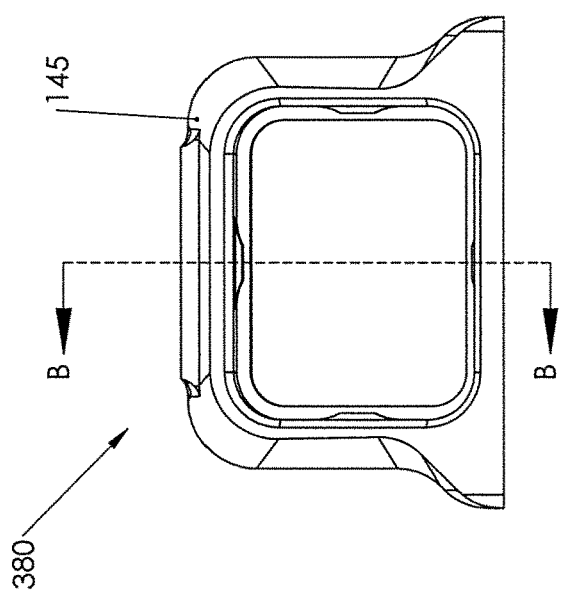
FIG. 10A is a rear view of a portion of the window housing of FIG. 2 without temperature compensation.

FIG. 7A shows a view of the rearward (toward the user) end of the sight 50 and FIG. 7B shows a cross-sectional view of the sight 50 of FIG. 7A taken along lines B-B. FIG. 8A is a front view of a portion of the sight 50 of FIG. 2 showing a non-diffraction element (NDE) holder and FIG. 8B is a cross sectional view of the portion of FIG. 8A taken along lines B-B showing a non-diffraction element (NDE) holder. FIGS. 9A & 9B show rear (toward user) and front (toward target) perspective views, respectively, of the hybrid holographic sight 50. FIG. 10A is a rear view of the window housing 380 of the sight of FIG. 2 without temperature compensation and FIG. 10B is a cross sectional view of the window housing of FIG. 10A taken along lines B-B. A mirror 375 is mounted on an inner surface of the top wall 145 in the housing 380. The mirror 375 may be attached with a mirror frame 365. There is no mirror compensation in this embodiment.

Figure 11B:
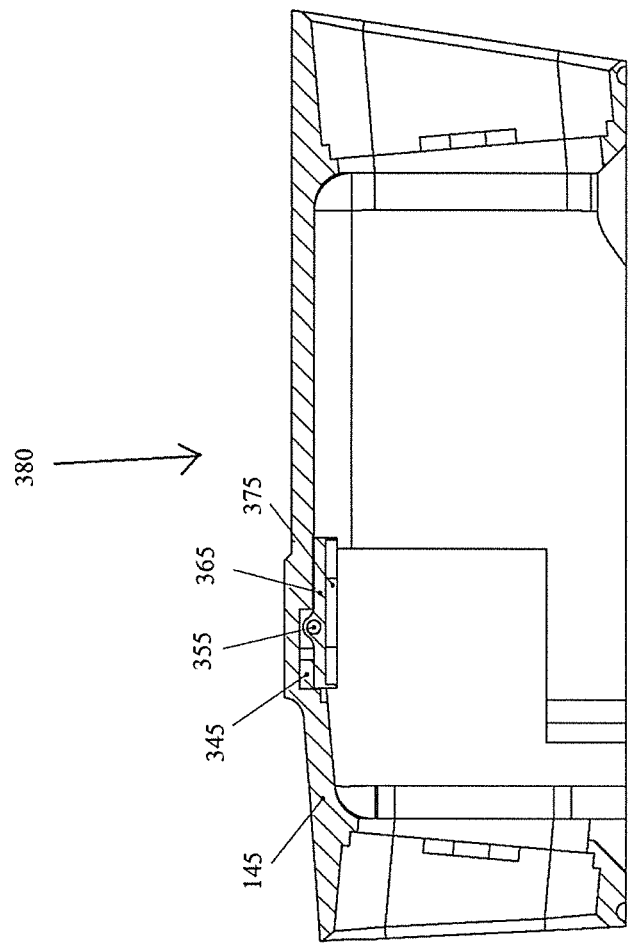
FIG. 11B is a cross sectional view of the window housing of FIG. 11A taken along lines B-B.
Figure 11A:
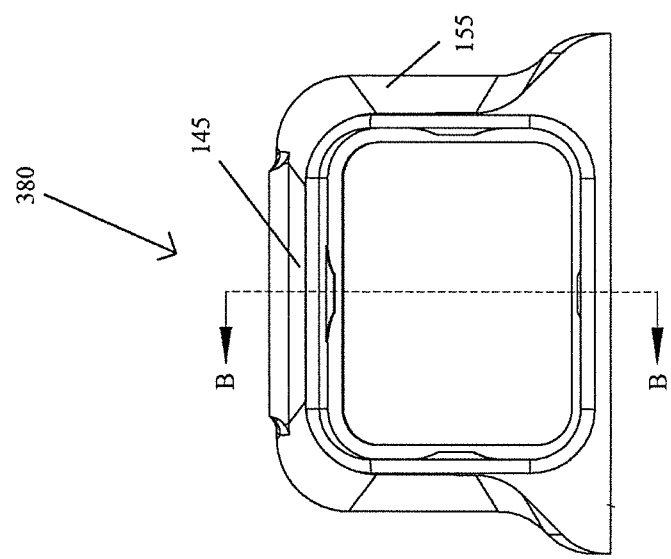
FIG. 11A is a front view of a window housing of another version of the sight of FIG. 2 with temperature compensation.

A change in ambient temperature of the weapon or optical device may cause a change in the wavelength of the light source, which introduces an error in the form of an angular and/or length change in the desired light beam. The beam may be adjusted for the angle and/or length by moving any of the optical components, such as the light source 285, mirror 375 and/or HOE 295. A change in the angle and/or length of the beam may be compensated for in the some versions of the present invention. First, using a mirror for such compensation is described. FIG. 11A is a rear view of a window housing of another version of the sight of FIG. 2 with temperature compensation. FIG. 11B is a cross sectional view of the window housing of FIG. 11A taken along lines B-B.

FIG. 11B shows the mirror compensation assembly mounted on the inner surface of the top wall 145 in the housing 380. Mirror 375 is disposed on the mirror frame 365, which may be rotated pivotally about an axis defined by a mirror pin 355. Thus, the mirror frame 365 is attached to the top wall 145 by mirror pin 355. The housing 380 may have a mirror temperature compensator 345 that may change in at least one dimension due to the change in ambient temperature. The mirror temperature compensator 345 may have a coefficient of thermal expansion and move the mirror in response to changes in temperature. A mirror temperature compensator 345 may be attached with the top wall 145 and mirror frame 365 such that any change in dimension of the mirror temperature compensator 345 due to temperature variation will cause the mirror frame 365 to rotate pivotally about the mirror pin 355. Therefore, as at least one dimension of the mirror temperature compensator 345 changes, the mirror 375 rotates and changes the angle of the light beam. The material, shape and configuration of the mirror temperature compensator may be selected such that the position of the mirror is adjusted to compensate for any ambient temperature variation. In other embodiments, both the mirror angle and distance may be adjusted using a Micro-Electro-Mechanical System (MEMS) device to compensate for any ambient temperature variation.

Next, using a light source 285 to compensate for a change in wavelength of the light beam due to ambient temperature variation is described. FIG. 12A shows a rear view of the carrier 200. FIG. 12B is a cross sectional view of the carrier of FIG. 12A taken along lines B-B. FIG. 12B shows a light source 285 disposed in the carrier 200. A diode depth compensator 275 may be attached between the light source 285 and the carrier 200. The diode depth compensator 275 may have a coefficient of thermal expansion and move the diode/light source in response to changes in temperature. The diode depth compensator 275 may expand or contract depending on the ambient temperature variation and thus may move the light source 285 in a forward or backward direction. This movement changes the distance the light beam travels before illuminating the mirror and therefore the total light path length. The material, shape and configuration of the diode depth compensator 275 may be selected such that the position of the light source is adjusted to compensate for any ambient temperature variation.

FIG. 13 is a light path diagram of an embodiment of the present invention that lacks temperature compensation. A light source 285 projects a light beam along a path 290. The light beam illuminates a mirror 375, which reflects the light beam so as to illuminate an HOE 295. The HOE 295 reconstructs an image of a reticle and an NDE 310 reflects the image of the reticle such that a user's eye 10 can view the reticle through the light beam 292. The axis or path along which the user looks through the NDE may be referred to as a viewing path. This path extends from the user's eye to a target and, in this version, passes through the NDE. It does not pass through any HOE. As will be clear to those of skill in the art, the light beam reflected from the mirror illuminates the HOE 295 at a shallow angle in this particular example. This illumination angle is the angle between an axis extending perpendicular to the HOE and the path from the mirror to the HOE. It is also noted that many embodiments discussed herein, including the embodiment of FIG. 13, illuminate the HOE with non-collimated light.

Figure 14:
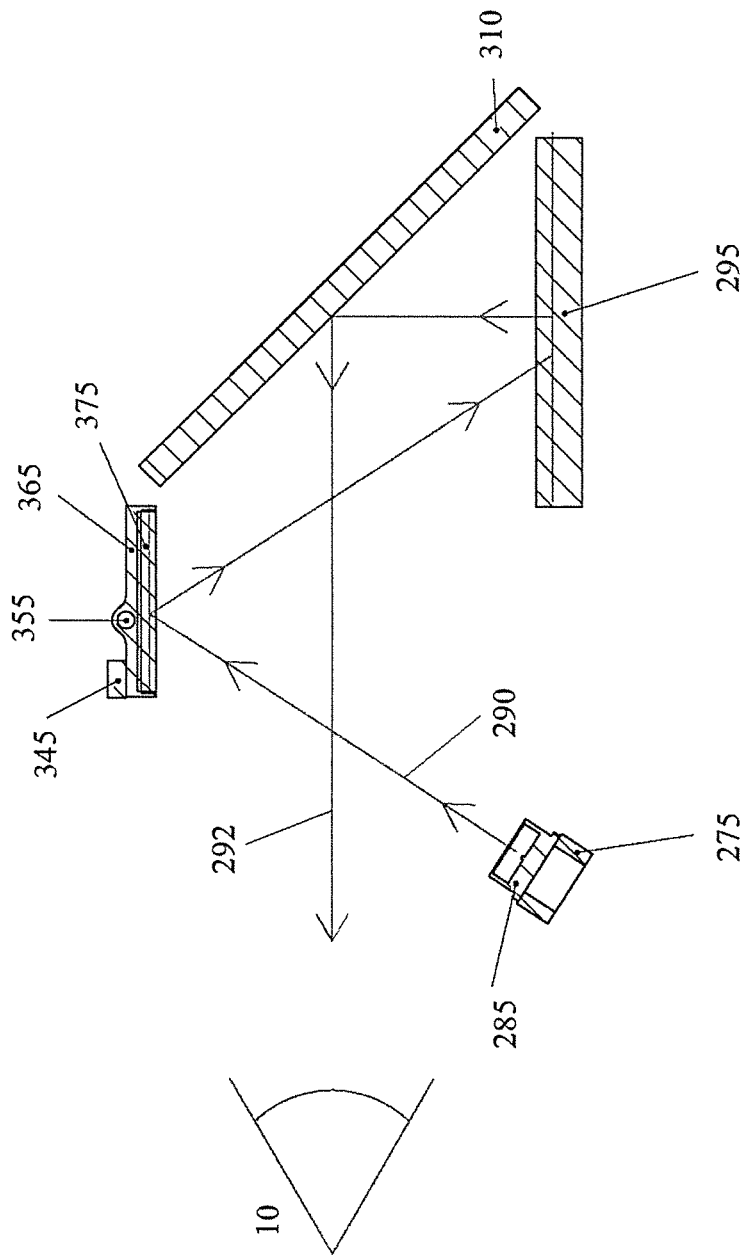
FIG. 14 is a light path diagram for another embodiment with compensation for the mirror and light source.

Next, FIG. 14 is a light path diagram for another embodiment that includes temperature compensation for the mirror 375 and the light source 285. A light source 285 projects a light beam along a light path 290. The light beam illuminates a mirror 375, which reflects the light beam so as to illuminate an HOE 295, which reconstructs a reticle. As discussed earlier, the change in ambient temperature of the weapon or optical device may cause a change in the wavelength of the light source 285, which introduces an error in the form of an angular and/or length change in the desired read out beam. The diode depth compensator 275 expands or contracts to move the light source 285 in a forward or backward direction and thus changes the length of the light path. The light beam travels along a light path that illuminates a mirror 375, and reflects the light beam so as to illuminate an HOE 295. As discussed with respect to FIG. 11B, the angular position of the mirror 375 is moved by the mirror temperature compensator 345, which changes the angle of the light beam and compensates for any ambient temperature variation. The HOE 295 reconstructs an image of a reticle and an NDE 310 reflects the image of the reticle such that a user's eye 10 can view the reticle along the viewing path.

Figure 15:
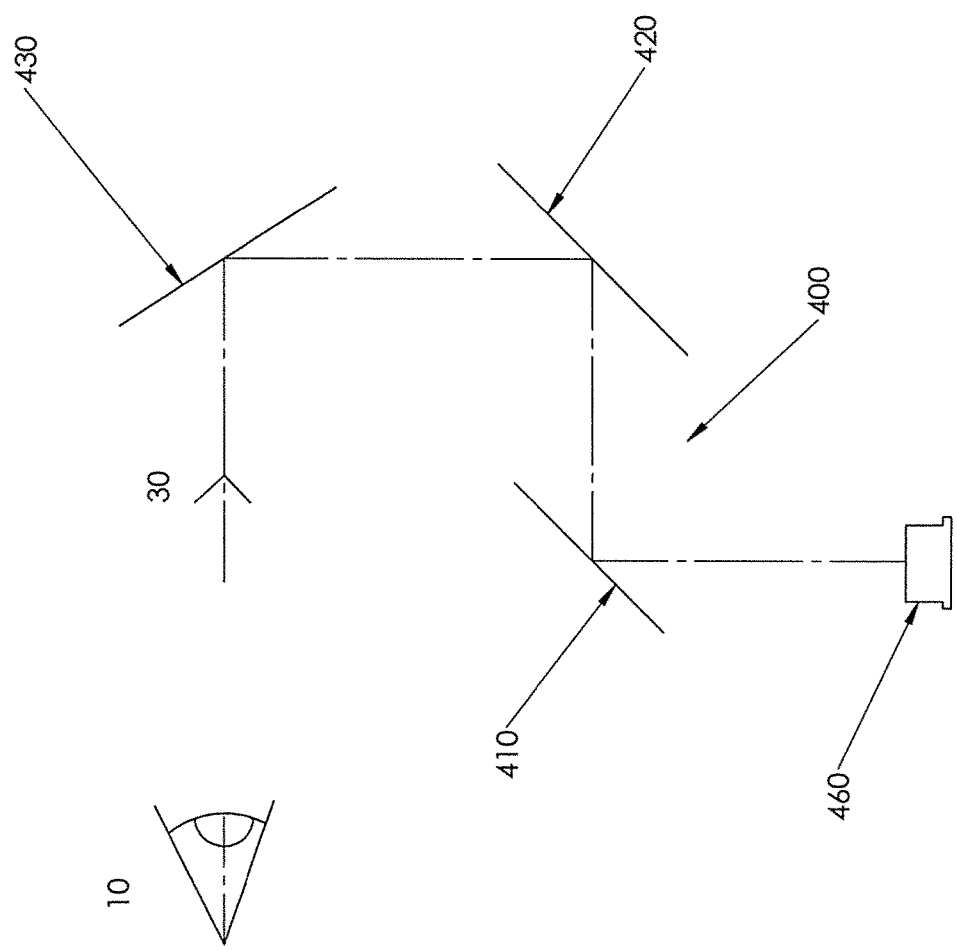
FIG. 15 is a light path diagram for a further embodiment of the invention that includes a grating, a Holographic Optical Element (HOE), and a non-diffraction element (NDE)

Referring to FIG. 15, a further embodiment of the present invention is discussed. This embodiment provides a sight 400 that may be used for aiming weapons or optical devices. The sight 400 may be mounted or attached to a weapon or optical device. A hybrid holographic sight 400 may comprise a light source 460 that projects a light beam along a light path. In some embodiments of the present invention, the light source may be a laser diode. The light source, for any embodiment herein, may or may not include a wavelength-stabilization control as disclosed in Applicant's co-pending U.S. patent application Ser. No. 14/331,925, filed Jul. 15, 2014, the entire contents of which is incorporated herein by reference. The sight 400 also has NDE 430 and an HOE 420 disposed in the path of the light beam. The HOE 420 reconstructs an image of a reticle and the NDE 430 reflects an image of the reticle. A user's eye 10 looks through the NDE 430 along the viewing path and sees the reflected image of the reticle.

The sight 400 may have a grating 410 that is disposed in the path of the beam between the light source 460 and the HOE 420. The light path for an embodiment of the gun sight may be defined as extending along the path of the light beam and the path of the reconstructed beam. The light beam from the light source 460 illuminates the grating 410 and the grating 410 reconstructs a beam that illuminates the HOE 420. The sight 400 may have an adjustment mechanism (not shown) for the adjustment of the non-diffraction element 430. The adjustment mechanism may be operable to rotate the NDE 430 about at least one axis. Some embodiments may allow rotation of the NDE about two axes to allow for windage and elevation adjustment. In some versions, the position of the other elements, including the light source 460, grating 410 and HOE 420 may be fixed relative to each other and relative to a mounting surface of the sight 400. In these versions, only the NDE 430 may be adjustably positioned for the windage and elevation compensation. By fixing the relative positions of the other elements, the performance and durability of the sight may be improved. Alternatively, the sight 400 may have another adjustment mechanism (not shown) for the adjustment of the grating 410, HOE 420 or light source 460.

The sight 400 may have a housing, and some or all of the components of the sight 400 may be disposed inside this housing. The sight 400 may have two ends, a rear or viewing end and an opposing front or target end. The sight 400 may also have a viewing path 30 defined from the viewing end to the target end. The non-diffraction element 430 is disposed in the viewing path 30. A user's eye 10 may view a target (not shown) along the viewing path 30 through the non-diffraction element 430 from the viewing end of the housing. The sight 400 may be mounted on a weapon or an optical device. The sight 400 may have at least one polarizer (not shown) that is disposed between the light source 460 and the grating 410. The light beam passes through the at least one polarizer and illuminates the grating 410. This polarizer may be useful in attenuating and/or steering the light beam. The polarizer may comprise a liquid crystal panel.

The NDE 430 may consist of a partial mirror, glass or an element with a dichroic film coating. In one embodiment, the NDE may be an optical element such as a piece of glass with a dichroic film coating such that the NDE preferentially reflects light with wavelength corresponding to the reconstructed reticle and passes other wavelengths. An eye 10 views the target (not shown) through an NDE 430 and not through an HOE 420. Additionally, the reconstructed beam directly illuminates the HOE 420 and not an eye 10. The reconstructed reticle is projected on the NDE 430 and a user views that image through the NDE 430. This arrangement not only provides improved transparency/optical clarity for a user's view, but also reduces the amount of light that escapes from the sight 400 towards the viewing end or the target end. In this embodiment, the grating 410 and the HOE 420 are both reflection-type holographic elements. For some embodiments disclosed herein, a transmission-type element may be substituted for a reflection-type element, or vice versa, with appropriate adjustments in the position of the optical elements. In the illustrated embodiment, the light source 460, grating 410 and HOE 420 are all disposed on the same side of the viewing path 30; in this case below the viewing path 30.

Figure 16:
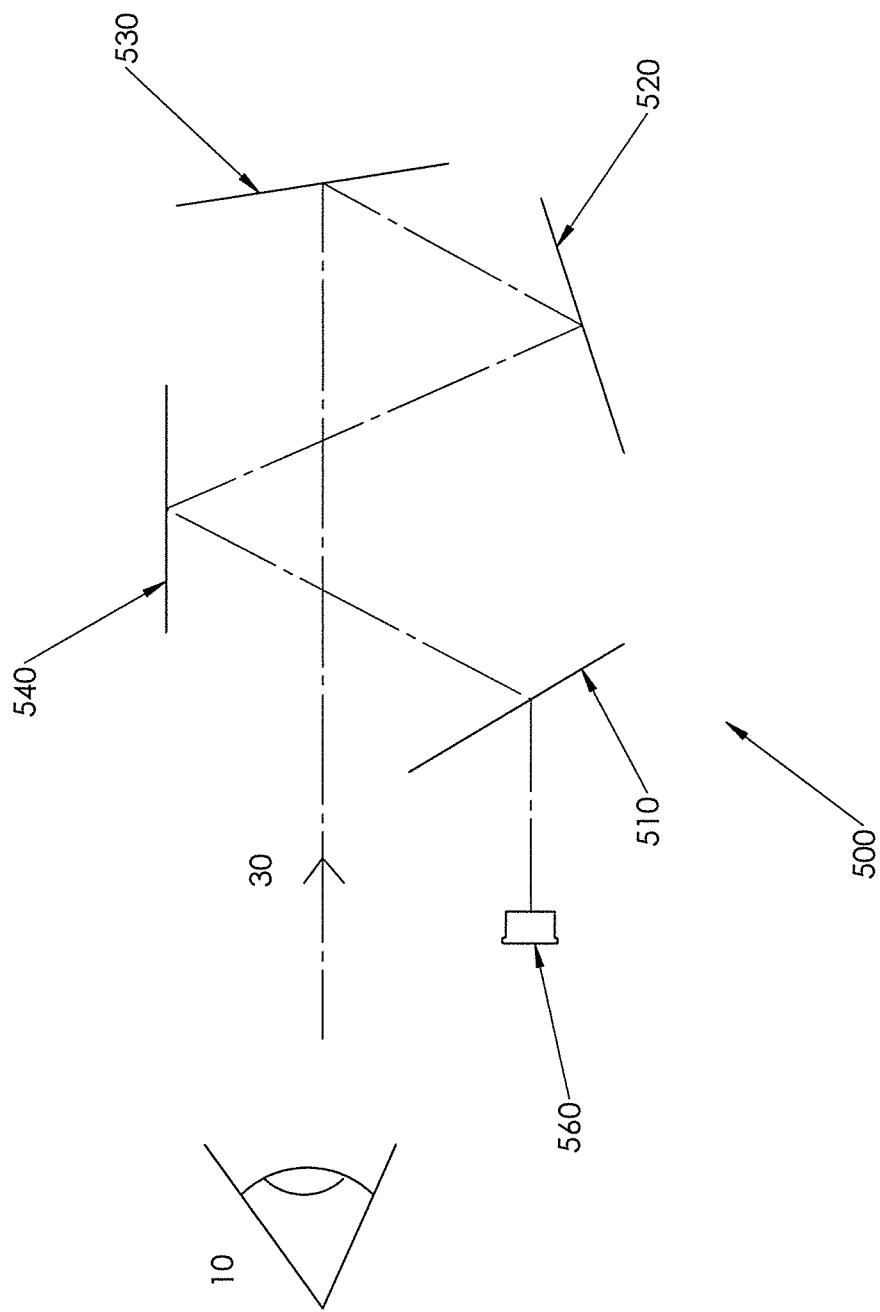
FIG. 16 is a light path diagram of another embodiment of the invention that includes a grating, a mirror, a Holographic Optical Element (HOE), and a non-diffraction element (NDE)

Referring to FIG. 16, another embodiment of the present invention is discussed. The sight 500 may be used for aiming weapons or optical devices. The sight 500 may be mounted or attached to a weapon or optical device. A hybrid holographic sight 500 may comprise a light source 560 that projects a light beam along a light path. The sight 500 may also have an NDE 530 and an HOE 520 disposed in the path of the light beam. The HOE 520 reconstructs an image of a reticle and projects it on the NDE 530. The non-diffraction element 530 reflects the image of the reticle. The eye 10 looks through the non-diffraction element 530 and sees the reflected image of the reticle.

The sight 500 may have a transmission-type grating 510 that is disposed in the path of the light beam between the light source 560 and a mirror 540. The light beam from the light source 560 illuminates the grating 510 and thereafter the grating 510 reconstructs the beam and illuminates the mirror 540. The mirror 540 reflects the reconstructed beam and illuminates the reflection-type HOE 520. The sight 500 may have an adjustment mechanism to adjust the position of the NDE, to provide windage and/or elevation compensation, and the other elements may be fixed relative to one another and to the housing of the sight. Alternatively, other optical elements may be adjustable.

The sight 500 may have a housing, and some or all of the components of the sight 500 may be disposed inside this housing. The sight 500 may have two ends; a viewing end and an opposing target end. The sight 500 may also have a viewing path 30 defined from the viewing end to the target end. The NDE 530 is disposed in the viewing path 30. A user's eye 10 may view a target (not shown) along the viewing path 30 through the NDE 530 from the viewing end of the housing. The sight 500 may be mounted on a weapon or an optical device. The sight 500 may have at least one polarizer (not shown) that is disposed between the light source 560 and the grating 510. The beam may pass through the at least one polarizer and illuminate the grating 510. This polarizer may be useful in attenuating and/or steering the light beam. The polarizer may comprise a liquid crystal panel. In the illustrated embodiment, the mirror 540 is disposed on an opposite side of the viewing path 30 from the grating 510 and HOE 520.

The NDE 530 may consist of a partial mirror, glass or dichroic film coating. In one embodiment, the NDE may be an optical element such as a piece of glass with a dichroic film coating such that the NDE preferentially reflects light with wavelength corresponding to the reconstructed reticle and passes other wavelengths. A user's eye 10 views the target (not shown) through the NDE 530 and not through the HOE 520. Additionally, the reconstructed beam illuminates the HOE 520 and not an eye 10. The reconstructed reticle is projected on the NDE 530 and a user views that image through the NDE 530. This arrangement not only provides improved transparency/optical clarity for a user's view, but also reduces the amount of light that escapes from the sight towards the viewing end or the target end.

Figure 17:
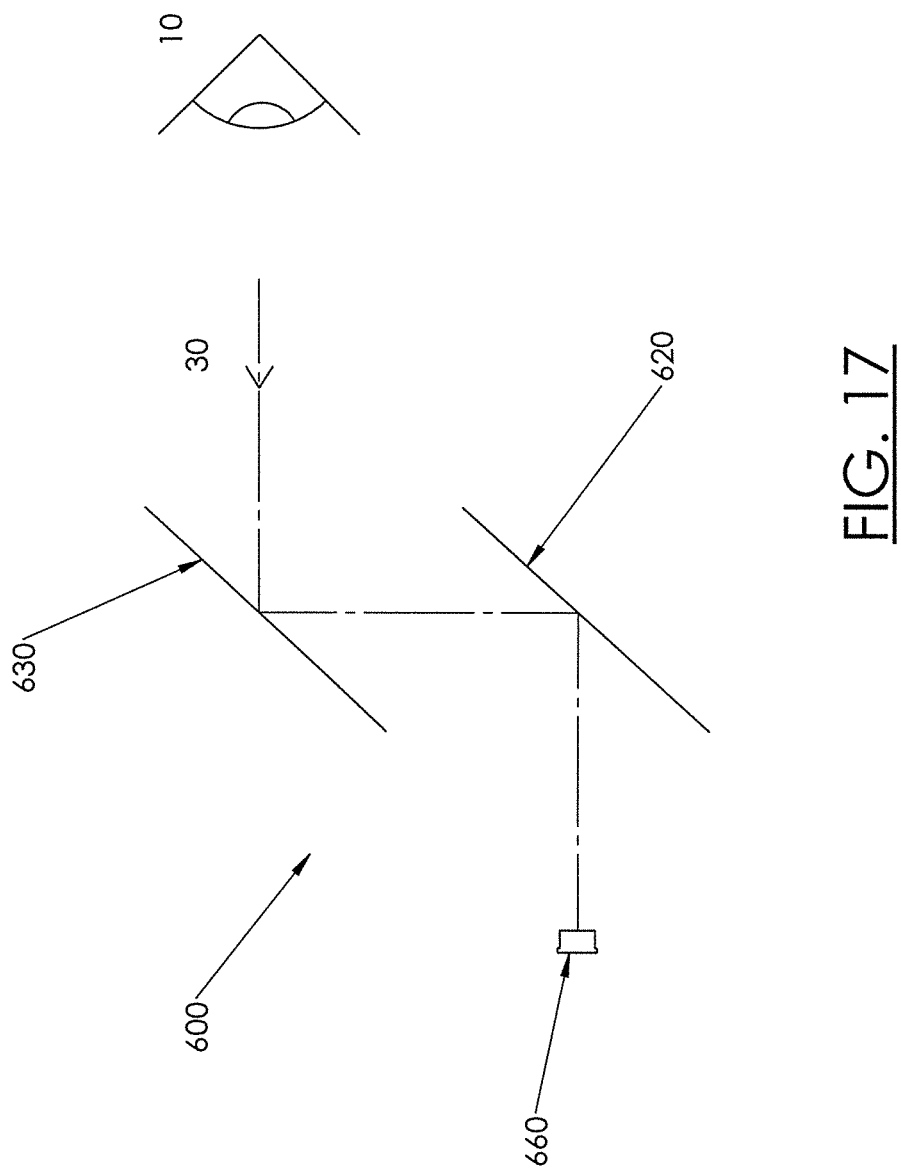
FIG. 17 is a light path diagram of yet another embodiment of the invention that includes a Holographic Optical Element (HOE) and a non-diffraction element (NDE)

Now referring to FIG. 17, yet another embodiment of the present invention is discussed. This embodiment provides a sight 600 that may be used for aiming weapons or optical devices. The sight 600 may be mounted or attached to a weapon or optical device. A hybrid holographic sight 600 may comprise a light source 660 that projects a light beam along a light path. The sight 600 may also have a NDE 630 and an HOE 620 disposed in the path of the light beam. The light source 660 directly illuminates the HOE 620, without any intermediate optical element such as a mirror or grating. The HOE 620 reconstructs an image of a reticle and projects it on the NDE 630. The NDE 630 reflects the image of the reticle. The eye 10 looks through the NDE 630 and sees the reflected image of the reticle.

The sight 600 may have an adjustment mechanism to adjust the position of the NDE, to provide windage and/or elevation compensation, and the other elements may be fixed relative to one another and to the housing of the sight. Alternatively, other optical elements may be adjustable.

The sight 600 may have a housing, and some or all of the components of the sight 600 may be disposed inside this housing. The sight 600 has a viewing end and an opposing target end. The sight 600 may also have a viewing path 30 defined from the viewing end to the target end. The NDE 630 is disposed in the viewing path 30. An eye 10 may view a target (not shown) along the viewing path 30 through the NDE 630 from the viewing end of the housing. The sight 600 may alternatively have at least one polarizer (not shown) that is disposed between the light source 660 and the HOE 620. The beam passes through the at least one polarizer and illuminates the HOE 620. This polarizer may be useful in attenuating and/or steering the light beam. The polarizer may comprise a liquid crystal panel. In this embodiment, the light source 660 and HOE 620 are both on the same side of the viewing path 30.

The NDE 630 may consist of a partial mirror, glass or dichroic film coating. In one embodiment, the NDE may be an optical element such as a piece of glass with a dichroic film coating such that the NDE preferentially reflects light with wavelength corresponding to the reconstructed reticle and passes other wavelengths. An eye 10 views the target (not shown) through an NDE 630 and not through a HOE 620. Additionally, the light beam illuminates the HOE 620 and not a user's eye 10. The reconstructed reticle is projected on the NDE 630 and a user views that image through the non-diffraction element 630. This arrangement not only provides improved transparency/optical clarity for a user's view, but also reduces the amount of light that escapes from the sight towards the viewing end or the target end.

Figure 18:
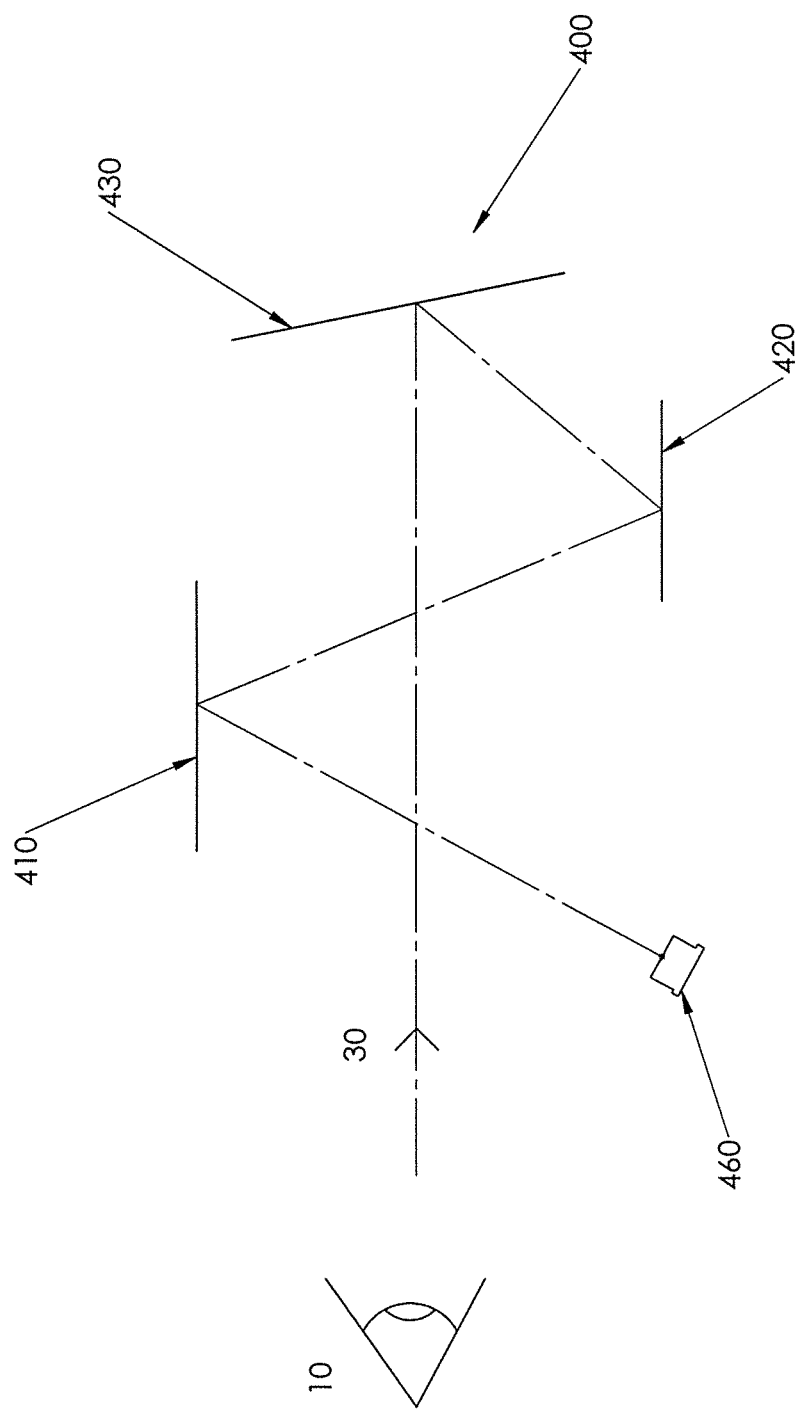
FIG. 18 is a light path diagram of another embodiment of the invention with an alternate light path that includes a grating, a Holographic Optical Element (HOE) and a non-diffraction element (NDE)

FIG. 18 illustrates another embodiment with an alternate light path for the hybrid holographic sight 400 shown in the FIG. 15. In FIG. 15, the sight 400 comprises a light source 460, a reflection-type grating 410, a reflection-type HOE 420 and an NDE 430. Similar to FIG. 15, the light source 460 projects the light beam and illuminates the grating 410. A user's eye 10 views the target (not shown) and a reflected image of a reticle along the viewing path 30 through the NDE 430. The sight 400 may have an adjustment mechanism to adjust the position of the NDE, to provide windage and/or elevation compensation, and the other elements may be fixed relative to one another and to the housing of the sight. Alternatively, other optical elements may be adjustable.

Figure 19:
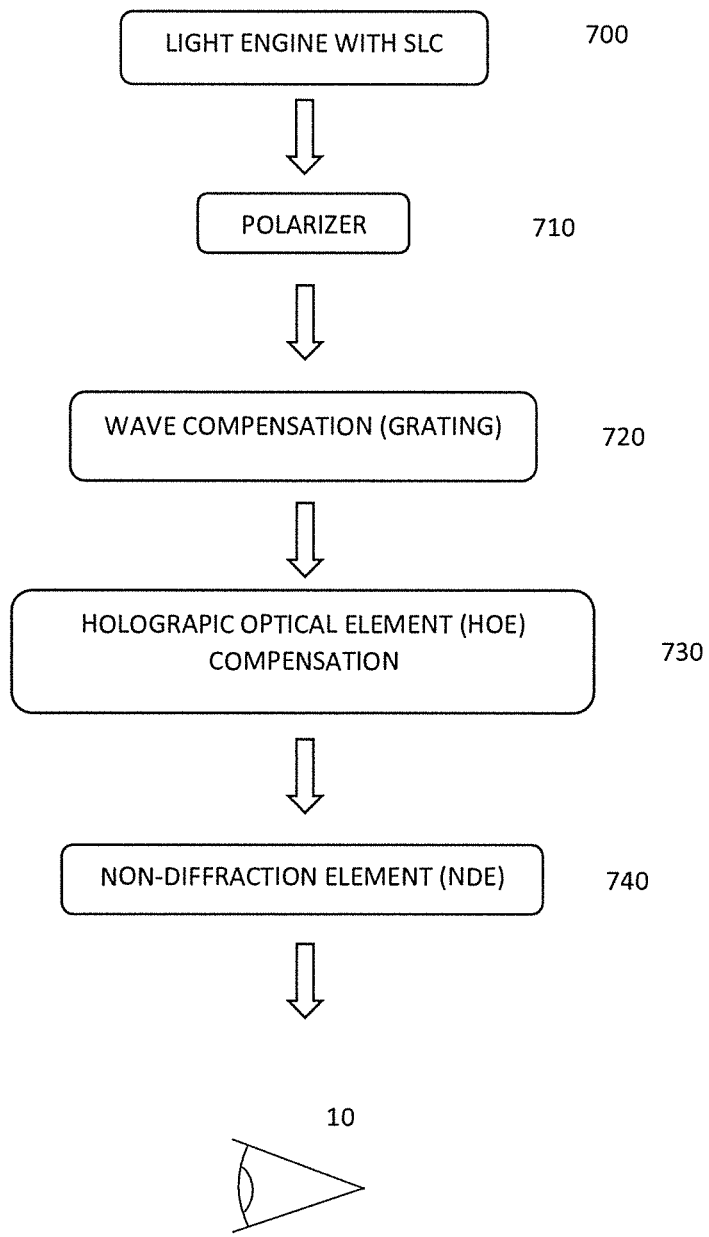
FIG. 19 illustrates an exemplary hybrid sight block diagram.

FIG. 19 illustrates an exemplary block diagram of a version of a hybrid holographic sight. Here, the light source 700 generates a light beam that passes through a polarizer 710 and illuminates a grating 720. The grating 720 may be used for wave compensation of the light beam. The grating 720 reconstructs the beam, which illuminates a HOE 730. The HOE 730 reconstructs the reticle and projects it on the NDE 740. The NDE 740 reflects the image of a reticle and a user 10 can then view the reconstructed image of the reticle through the NDE 740.

Figure 20:
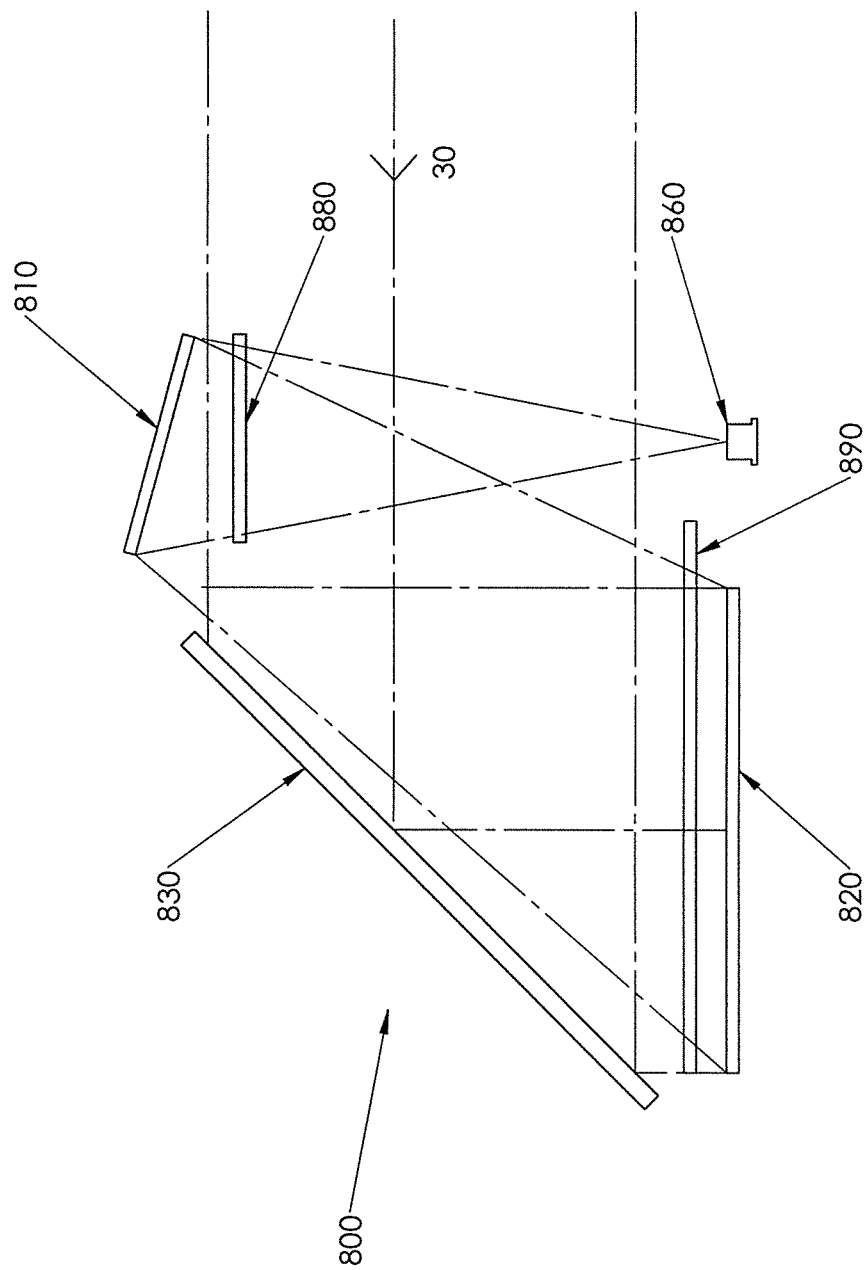
FIG. 20 illustrates a light path diagram of another embodiment of the invention.

Referring to FIG. 20, another non-limiting version of the present invention is discussed. The sight 800 that may be used for aiming weapons or optical devices. The sight 800 may be mounted or attached to a weapon or optical device. The hybrid holographic sight 800 may comprise a light source 860 that projects a light beam along a light path. The sight 800 may also have a NDE 830 and an HOE 820 disposed in the path of the light beam. The HOE 820 reconstructs an image of a reticle and projects it on the NDE 830. The NDE 830 reflects an image of the reticle. The eye 10 looks through the NDE 830 and sees the reflected image of the reticle.

The sight 800 may have a grating 810 that is disposed in the path of the beam between the light source 860 and the HOE 820. The light beam from the light source 860 illuminates the grating 810 and the grating 810 reconstructs a beam and illuminates the HOE 820. The sight 800 may have a mirror 810 instead of a grating. The mirror 810 receives the light beam from the light source 860 and reflects it towards the HOE 820. The sight 800 may have an adjustment mechanism to adjust the position of the NDE 830, to provide windage and/or elevation compensation, and the other elements may be fixed relative to one another and to the housing of the sight. Alternatively, other optical elements may be adjustable.

The sight 800 may have a housing, and some or all of the components of the sight 800 may be disposed inside this housing. The sight 800 has a viewing end and an opposing target end. The sight 800 may also have a viewing path 30 defined from the viewing end to the target end. The NDE 830 is disposed in the viewing path 30. A user's eye 10 may view a target (not shown) along the viewing path 30 through the NDE 830 from the viewing end of the housing. The grating and/or mirror in any of the embodiments according to this invention may be disposed above the viewing path 30 of the sight, with the light source 860 and HOE 820 mounted below the viewing path 30. The sight 800 may have at least one polarizer 880 that is disposed between the light source 860 and the grating 810. The polarizer 880 and the grating/mirror 810 may be arranged parallel or at an angle to each other. The beam passes through the at least one polarizer 880 and illuminates the grating 810. This polarizer 880 may be useful in attenuating and/or steering the light beam. The polarizer 880 may comprise a liquid crystal panel. The sight 800 may have at least one polarizer 890 disposed in front of the HOE 820. An arrangement of two polarizers may be used for brightness control in the sight 800 or any other embodiments herein. Some embodiments may have additional polarizer(s) in front of the light source 860. Further versions may have no polarizer.

In another embodiment, the grating and the HOE may be parallel to each other, or be otherwise arranged to provide an achromat. In such an embodiment, the light source may be moved from the illustrated position to compensate for the parallel grating.

The NDE 830 may consist of a partial mirror, glass or an element with a dichroic film coating. In one embodiment, the NDE may be an optical element such as a piece of glass with a dichroic film coating such that the NDE preferentially reflects light with wavelength corresponding to the reconstructed reticle and passes other wavelengths. In some alternatives of any version herein, the NDE 830 may be a magnifier. A user's eye 10 views the target (not shown) through an NDE 830 and not through an HOE 820. Additionally, the reconstructed beam illuminates the HOE 820 and not an eye 10. The reconstructed reticle is projected on the NDE 830 and a user views that image through the NDE 830. This arrangement not only provides improved transparency/optical clarity for a user's view, but also reduces the amount of light that escapes from the sight towards the viewing end or the target end.

Alternative embodiments of the present invention may include additional optical elements, such as lenses and/or additional mirrors. In certain embodiments, the NDE may form part of a sight with fixed or adjustable magnification, and the NDE may be a lens. One or more polarizers may be provided in any of the embodiments, and may allow for adjustments of various types. Some versions have a mirror that may be substituted by a grating, and vice versa. One or more polarizers or filters may be used with any of the versions discussed herein.

The foregoing detailed description has been presented for purposes of illustration and description. It is not intended to be exhaustive or to limit embodiments to the precise form disclosed. Many modifications and variations are possible in light of the above teaching. The described embodiments were chosen to explain principles and practical applications, to thereby enable others skilled in the art to utilize various embodiments and with various modifications as are suited to the particular use contemplated. As will be clear to those of skill in the art, the illustrated and discussed embodiments of the present invention may be altered in various ways without departing from the scope or teaching of the present invention. As such, this disclosure should be interpreted broadly. It is intended that the scope be defined by the claims appended hereto.

The invention claimed is:

1. A hybrid holographic gun sight, comprising:
   a housing having a viewing end and an opposing target end, a viewing path being defined from the viewing end to the target end;
   a light source operable to project a light beam along a path;
   a holographic optical element (HOE) disposed in the path of the light beam, the HOE reconstructing an image of a reticle; and
   a non-diffraction element (NDE) reflecting the image of the reticle, the non-diffraction element being disposed in the viewing path such that a user views a target along the viewing path through the non-diffraction element from the viewing end.

2. A sight according to claim 1, wherein the light source is a laser diode or a vertical-cavity surface-emitting laser diode (VCSEL).

3. A sight according to claim 1, wherein the non-diffraction element (NDE) is selected from the group consisting of a partial mirror, a glass element and an optical element with a dichroic film coating.

4. A sight according to any of claim 1, further comprising:
   a grating disposed in the path of the light beam from the light source, the grating reconstructing a beam and illuminating the HOE with the reconstructed beam, the light path defined as extending along the path of the light beam and the path of the reconstructed beam; or
   a mirror disposed in the path of the light beam from the light source, the mirror reflecting the light beam onto the holographic optical element (HOE) and illuminating the holographic optical element (HOE).

5. A sight according to claim 4, further comprising an adjustment mechanism selected from the group consisting of:
   a temperature compensator supporting the light source, the temperature compensator operable to change an angle and/or position of the light beam projected by the light source along the path, the temperature compensator having a coefficient of thermal expansion, the temperature compensator changing the angle and/or position of the light beam in response to changes in temperature; and
   a mirror adjustment mechanism operable to move the mirror relative to at least one axis, the mirror adjustment mechanism comprising a mirror temperature compensator having a coefficient of thermal expansion such that the mirror temperature compensator moves the mirror n response to changes in temperature.

6. A sight according to any of claim 1, wherein the light beam illuminating the holographic optical element is a non-collimated light beam.

7. A sight according to any of claim 1, where the light source directly illuminates the HOE without any intermediate element.

8. A sight according to any of claim 1, further comprising a polarizer disposed between the light source and the HOE.

9. A sight according to any of claim 1, further comprising a base configured to attach to a weapon, the base having a lower surface and an upper surface, the lower surface configured to engage the weapon or the optical device.

10. A sight according to any of claim 1, further comprising a front window disposed at the target end of the housing and a rear window at the viewing end of the housing, each window comprising a protective lens spaced apart from the non-diffraction element (NDE) whereby the non-diffraction element (NDE) remains functional even if one of the protective lenses is removed or broken.

11. A sight according to any of claim 1, further comprising an adjustment mechanism operable to move the non-diffraction element relative to at least one axis, thereby providing a windage and/or elevation adjustment.

12. A sight according to any of claim 1, further comprising:
   a base configured to attach to a weapon or an optical device, the base having a lower surface and an upper surface, the lower surface configured to engage the weapon or the optical device;
   a carrier having a lower surface and an upper surface, the lower surface of the carrier being disposed near the upper surface of the base, the carrier having a front surface, a rear surface and two opposing side surfaces, the holographic optical element (HOE) and the light source being disposed on the upper surface of the carrier;
   a vertical pivot bolt connecting the carrier to the base such that the carrier is pivotally movable in a generally horizontal plane about a vertical axis defined by the pivot bolt;
   a windage adjustment mechanism disposed in the carrier, the windage adjustment mechanism having a windage screw operable to pivotally move the carrier about the vertical axis;
   an element holder disposed above the upper surface of the carrier and pivotally connected to the two opposing side surfaces for pivoting about a horizontal transverse axis, the non-diffraction element (NDE) being disposed in the element holder an angle with respect to the upper surface of the carrier;

an elevation adjustment mechanism having an elevation screw disposed through one of the side surfaces of the carrier near the rear surface of the carrier and an elevation nut being attached to the elevation screw, the elevation nut having an upper surface and a lower surface, the upper surface being angled with respect to the upper surface of the carrier, the upper surface of the elevation nut being in contact with the element holder such that transverse movement of the elevation nut pivotably moves the element holder, the elevation adjustment mechanism further having a resilient member disposed between the element holder and the upper surface of the carrier near the front surface of the carrier to bias a front portion of the element holder away from the carrier;

wherein the housing comprises a window housing having a top wall, an open bottom, two opposing lateral walls, a front window and a rear window cooperating to define an interior chamber of the housing, the front and rear windows longitudinally opposing each other, the housing being disposed on the carrier such that the element holder is disposed in the interior chamber; and a mirror disposed on an inner surface of the top wall in the path of the light beam from the light source, the mirror reflecting the light beam onto the holographic optical element (HOE) and illuminating the holographic optical element (HOE).

13. A sight according to claim 1, wherein there is no holographic optical element (HOE) in the viewing path.

14. A adjustable holographic sight, comprising:
a housing having a viewing end and an opposing front end, a viewing path being defined from the viewing end to the front end;
a light source operable to project a light beam along a path;
a holographic optical element (HOE) disposed in the path of the light beam, the HOE reconstructing an image of a reticle;
a non-diffraction element (NDE) reflecting the image of the reticle, the non-diffraction element being disposed in the viewing path such that a user views a target along the viewing path through the non-diffraction element from the viewing end; and
an adjustment mechanism operable to move the non-diffraction element relative to at least one axis, thereby providing a windage and/or elevation adjustment.

15. A sight according to claim 14, wherein the sight is a weapon sight or a sight for an optical instrument.

16. A sight according to claim 15, further comprising:
a base having a lower surface and an upper surface, the lower surface of the base configured to engage the weapon or the optical device;
a carrier having a lower surface and an upper surface, the lower surface of the carrier being disposed near the upper surface of the base, the holographic optical element (HOE) and the light source being disposed on the upper surface of the carrier;
a vertical pivot bolt connecting the carrier to the base such that the carrier is pivotally movable in a generally horizontal plane about a vertical axis defined by the pivot bolt;
wherein the adjustment mechanism comprises a windage adjustment mechanism disposed in the carrier, the windage adjustment mechanism having a windage screw operable to pivotally move the carrier about the vertical axis.

17. A sight according to claim 14, further comprising:
an element holder supporting the non-diffraction element (NDE) disposed at an angle with respect to the viewing path, the element holder being pivotal with respect a transverse axis;
wherein the adjustment mechanism comprises an elevation adjustment mechanism operable to pivot the element holder with respect to the transverse axis.

18. A sight according to claim 17, wherein the elevation adjustment mechanism comprises:
an elevation screw and an elevation nut being attached to the elevation screw, the elevation nut having an upper surface and a lower surface, the upper surface having an angle, the upper surface of the elevation nut being in contact with the element holder such that transverse movement of the elevation nut pivotally moves the element holder; and
a resilient member biasing the element holder into contact with the elevation nut.

19. A sight according to any of claim 14, wherein the housing comprises a window housing having a top wall, two opposing lateral walls, a front window and a rear window cooperating to define an interior chamber of the housing, the front and rear windows longitudinally opposing, each other, the non-diffraction element (NDE) being disposed in the interior chamber.

20. A sight according to claim 19, further comprising a mirror disposed on an inner surface of the top wall in the path of the light beam from the light source, the mirror reflecting the light beam so as to illuminate the HOE.

21. A sight according to any of claim 14, wherein:
the light source is a laser diode or a vertical-cavity surface-emitting laser diode (VCSEL); and
the non-diffraction element (NDE) is selected from the group consisting of a partial mirror, a glass element and an optical element with a dichroic film coating.

* * * * *